US007062595B2

(12) United States Patent
Lindsay et al.

(10) Patent No.: US 7,062,595 B2
(45) Date of Patent: Jun. 13, 2006

(54) INTEGRATED GIGABIT ETHERNET PCI-X CONTROLLER

(75) Inventors: Steven B. Lindsay, Mission Viejo, CA (US); Andrew SeungHo Hwang, Redondo Beach, CA (US); Andrew M. Naylor, Costa Mesa, CA (US); Michael Asker, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 289 days.

(21) Appl. No.: 10/132,531

(22) Filed: Apr. 24, 2002

(65) Prior Publication Data

US 2002/0194415 A1  Dec. 19, 2002

Related U.S. Application Data

(60) Provisional application No. 60/286,320, filed on Apr. 24, 2001.

(51) Int. Cl.
*G06F 13/26* (2006.01)
*G06F 1/12* (2006.01)

(52) U.S. Cl. .................. 710/315; 710/105; 714/401
(58) Field of Classification Search ............... 710/58, 710/60, 105–106, 118, 315; 713/400–401, 713/503; 370/466; 326/93
See application file for complete search history.

(56) References Cited

U.S. PATENT DOCUMENTS

| 5,652,530 | A | * | 7/1997 | Ashuri ........................ 326/93 |
| 5,761,429 | A |   | 6/1998 | Thompson |
| 6,175,927 | B1 |  | 1/2001 | Cromer et al. |
| 6,425,067 | B1 |  | 7/2002 | Chong et al. |
| 6,570,884 | B1 | * | 5/2003 | Connery et al. ............ 370/419 |
| 6,754,209 | B1 | * | 6/2004 | Stachura et al. ............ 370/389 |
| 6,829,715 | B1 | * | 12/2004 | Chiao et al. ................ 713/401 |

OTHER PUBLICATIONS

Intel 82546EB Dual Port Gigabit Ethernet Controller Onboard, undated.*
PCT International Search Report for International Application No. PCT/US02/12151, dated Sep. 4, 2002.
Distributed Management Task Force, Inc. (DMTF). Specification - DSP0114; Status Final, copyright 2000, 2001. Alert Standard Format (ASF) Specification, Version 1.03, Jun. 20, 2001, pp. 1-v; 2-79.

* cited by examiner

*Primary Examiner*—Khanh Dang
(74) *Attorney, Agent, or Firm*—Christie, Parker & Hale, LLP

(57) ABSTRACT

A network controller having a multiprotocol bus interface adapter coupled between a communication network and a computer bus, the adapter including a predictive time base generator; and a management bus controller adapted to monitor and manage preselected components coupled with one of the communication network and the computer bus. The management bus controller is adapted to employ an Alert Standard Format (ASF) specification protocol, a System Management Bus (SMBus) specification protocol, an Intelligent Platform Management Interface (IPMI) specification protocol, a Simple Network Management Protocol (SNMP), or a combination thereof. The network controller also includes a 10/100/1000BASE-T IEEE Std. 802.3-compliant transceiver and media access controller coupled with the communication network; a buffer memory coupled with the MAC, wherein the buffer memory includes one of a packet buffer memory, a frame buffer memory, a queue memory, and a combination thereof; and a transmit CPU and a receive CPU coupled with the multiprotocol bus interface adapter and the management bus controller. The network controller can be a single-chip VLSI device in an 0.18 micron CMOS VLSI implementation.

20 Claims, 12 Drawing Sheets

INTEGRATED GIGABIT ETHERNET PCI-X CONTROLLER

CROSS-REFERENCE TO RELATED APPLICATIONS

The present application claims priority on the basis of the following United States Provisional Patent Application, the entire contents of which is herein incorporated by reference as though set forth in full: Ser. No. 60/286,320, filed Apr. 24, 2001, and entitled "INTEGRATED GIGABIT ETHERNET PCI-X CONTROLLER." The present application also is related to co-pending U.S. patent application Ser. No. 09/865,844, filed May 25, 2001, and entitled "MULTIPROTOCOL COMPUTER BUS INTERFACE ADAPTER AND METHOD," the entire contents of which is incorporated herein by reference as though set forth in full. The present application also is related to co-pending United States Patent Application entitled "ALERTING SYSTEM, ARCHITECTURE AND CIRCUITRY," with named inventors Steven B. Lindsay, Andrew SeungHo Hwang and Andrew M. Naylor filed on Apr. 24, 2002, the entire contents of which is incorporated herein by reference as though set forth in full. The present application also is related to co-pending United States Patent Application entitled "POWER MANAGEMENT SYSTEM AND METHOD," with named inventors Steven B. Lindsay, Andrew SeungHo Hwang, Andrew M. Naylor, Scott Sterling McDonald and Habib Anthony Abouhossien filed on Apr. 24, 2002, the entire contents of which is incorporated herein by reference as though set forth in full. The present application also is related to co-pending United States Patent Application entitled "ASF MEMORY LOADING AND HANDLING SYSTEM," with named inventors Steven B. Lindsay, Andrew SeungHo Hwang and Andrew M. Naylor filed on Apr. 24, 2002, the entire contents of which is incorporated herein by reference as though set forth in full.

FIELD OF THE INVENTION

The present invention relates to computer bus interfaces, particularly to high-performance, high-bandwidth computer bus interfaces, and more particularly to a computer bus interface adapter providing integrated alerting and management functions, and having a predictive time base generator therein.

BACKGROUND OF THE INVENTION

Modern communications networks are demanding heterogeneous environments having associated complex communication, management, and support requirements. Some components may act as servers under some circumstances and as clients under others, in a hierarchy of control and management functions, in addition to the primary mission of effecting communications. Certain components are relatively permanent in the network structure, yet others are intermittently part of the active network because they are mobile or remotely-operated. In addition, while many network components are "always on", others may be made dormant during periods of inactivity or maintenance. In view of the above, it is desirable that advanced high-bandwidth, high-performance, local bus adapters and controllers operate robustly and intelligently in most, if not all, environments, thereby forcing designers to make trade-offs between features and functionality, and available motherboard slots or board real estate.

The term "system manageability" represents technologies that enable remote system access and control in both OS-present and OS-absent environments. "OS-absent" is defined herein as a networked computer system being in a state including, without limitation, no active OS, inoperable OS, or low-power, system-sleep state. These technologies are primarily focused on minimizing on-site maintenance; maximizing system availability and performance to the local user; maximizing remote visibility of (and access to) local systems by network administrators; and minimizing the system power consumption required to keep this remote connection intact. Technologies that require the OS to be present do not allow an administrator to have remote visibility or access to systems that have serious hardware or software problems, which prevent the OS from loading or working correctly. In addition, such OS-present technologies do not allow for a system to be remotely managed while in a low-power mode.

Furthermore, computer processors typically communicate with cooperating components along one or more computer buses. Peripheral components, including audio, and print devices, portable storage media, and low bandwidth networking devices usually are coupled with the bus through a peripheral or expansion computer bus interface adapter. On the other hand, devices with high bandwidth needs, including video, memory, high-performance networking, and core storage media often are linked to the CPU via a high bandwidth local bus interface adapter. Components on expansion buses typically have operational speeds many orders of magnitude slower than that of the CPU; however, such components sporadically access CPU and system resources and, thus, critical design issues such as bus latency, setup & hold times, and clock-to-data time are of little import to interface adapters designed for those applications.

Although high-bandwidth, high-performance, local bus components and adapters tend to operate at clock speeds much higher than their expansion bus counterparts, they still lag current CPU speeds by about an order of magnitude. However, because local bus components tend to interact with the CPU to a significant degree, slow, inefficient, and poorly-designed local bus interface adapters can potentially waste substantial amounts of processor and system resources. Therefore, local bus interface adapters are usually faced with observing strict timing budgets when accessing and providing data to the local bus.

Many factors can lead an adapter to violate the timing budget imposed by a bus protocol. For example, delays introduced in the clock trees and in the data paths of bus adapters, or both, can effectively decouple the interface adapter from the bus, because the adapter response time fails to remain synchronized to the bus clock. The functional characteristics of VLSI devices employed in such high-bandwidth, high-performance computer bus interface adapters can be susceptible to design and process variations during manufacturing. Also, the response of such adapters can be compromised by variations in environmental conditions while operating.

There is a need, then, for a local bus interface adapter that mitigates critical path delays within a computer bus interface adapter, or device, to the extent that they do not violate the aforementioned timing budgets. It is desirable that such an adapter is robust to design and process variations during manufacturing, as well as to the environmental conditions, which may be encountered during operations. Because multiple local bus protocols exist in common computer environments, there also is a need for a robust, multiprotocol computer bus interface adapter that is observant of stringent bus protocol timing budgets. There also is a need for an advanced, high-performance, high-bandwidth local bus adapter/controller that integrates complex network communication, management, and support features and functions onto a single VLSI chip.

To reduce the total cost of ownership of computing systems such as personal computers, a number of technologies have been developed to provide more cost effective system maintenance and to maximize system "up-time". For example, some of these technologies give IT administrators more visibility and control over remote systems. Traditionally, these technologies require that the "managed" system is an operational state with the Operating System (e.g., Microsoft Windows®) of the computing system loaded. Examples of technologies that require the operating system ("OS") to be loaded are DMI and CIM.

In general, however, technologies that require the OS to be loaded do not allow an administrator to have remote visibility or access to systems that have serious hardware or software problems that prevent the OS from loading or working correctly. In addition, these technologies do not allow for a system to be remotely managed while in a low power mode. For these scenarios, there is a need for a standardized low-level technology that gives administrators remote access to and control over the managed system.

Several vendors have developed proprietary technologies in this area. Intel and IBM created Alert on LAN (AoL) technology. AoL provided remote notification of local system states and various hardware or software failures in an OS absent environment. In addition, Intel and others developed the Platform Event Trap ("PET") format, to describe how alerts were formatted over the network.

As the number of these technologies increased, computing system vendors were faced with the possibility of having to support several different alerting standards. As a result, the Distributed Management Task Force developed an open remote control and alerting standard: the Alert Standard Format ("ASF").

ASF is a specification that defines methods for alerting and remote system control. ASF is specifically targeted at OS-absent environments. As used herein, the term "OS-absent" refers to a computer system that is in a state including, without limitation, a no active OS state, an inoperable OS state, a low-power state, and/or a system-sleep state.

The remote control and alerting system defined by ASF includes a management system that communicates with one or more clients. Here, the term "client" refers to a managed computing system. Typically, the management system is located remotely from the computing systems and communicates with the clients via a network. An alert sending device ("ASD"), which is a component in each client, interfaces with other components in the computing system to respond to remote control requests from the management system. Such requests include, for example, power-up, power-down and maintenance requests. The ASD also interfaces with sensors in the client computing system. When a sensor detects an "alert event," the ASD in the client sends a corresponding alerting message to the management system. To this end, the ASF specification defines interfaces for sensors, alert sending devices (which may include, for example, network interface cards or Modems), remote management console software, and system firmware in order to allow system vendors (and system component vendors) to develop ASF compliant products.

In summary, the above technologies, collectively referred to as "system manageability" technologies, enable remote system access and control in both OS-present and OS-absent environments. These technologies are primarily focused on minimizing on-site maintenance; maximizing system availability and performance to the local user; maximizing remote visibility of (and access to) local systems by network administrators; and minimizing the system power consumption required to keep this remote connection intact.

While the technologies discussed above address some of the problems associated with "system manageability," they fall short of addressing many issued involved in providing a robust remote control and alerting system for computing systems. In particular, in networked computing systems, there is a need for a cost effect, yet highly high functional system for managing a computing system using standard protocols when the OS is not present.

SUMMARY OF THE INVENTION

An embodiment of the invention is a network controller. Included is a multiprotocol bus interface adapter coupled between a communication network and a computer bus. The adapter has a clock signal input, a data delay element interposed in an output data path and imposing a predetermined output data delay upon output data, and a predictive time base generator coupled with the clock signal input and the data delay element. The time base generator has a predictive synchronizer having a synchronizing feedback loop therein, and a replica delay element coupled with the synchronizing feedback loop and adapted to provide feedback delay substantially replicating the predetermined output data delay. The replica delay element causes the predictive time base generator to provide a predictive clock signal to the data delay element and substantially reducing the predetermined output data delay. An alert supervisory controller is coupled with the multiprotocol bus interface adapter, and is adapted to monitor and manage preselected components coupled with one of the communication network and the computer bus.

An embodiment of the invention is in a network controller having a plurality of state machines receiving a plurality of inputs, effecting a plurality of predefined functions upon respective ones of the plurality of inputs, and producing a plurality of states thereby. An alert supervisory bus controller includes a processor operably coupled with the plurality of state machines and disposed to monitor the plurality of states and a rules-checker disposed to operate with the processor. The rules checker evaluates the plurality of states and identifies an alert supervisory state. The processor produces an predefined alert supervisory output responsive to the alert supervisory state.

An embodiment of the invention is also an alerting network controller which includes firmware coupled to an alert supervisory bus and bidirectionally translating data between an alert supervisory protocol and a network protocol. A network interface is coupled with the firmware and bidirectionally communicates the data between the firmware and a network implementing the network protocol.

The above needs can also be satisfied by providing an advanced, high-performance, high-bandwidth, highly-integrated controller that integrates complex network communication, management, and support features and functions onto a single VLSI chip. Embodiments of the invention can be realized as an Integrated Gigabit Ethernet PCI-X Controller. Embodiments of the invention may include a network controller coupled between a communication network and a computer bus which incorporates a multiprotocol bus interface adapter. The adapter has a clock signal input, a data delay element interposed in an output data path and imposing a predetermined output data delay upon output data, and a predictive time base generator coupled with the clock signal input and the data delay element. The time base generator has a predictive synchronizer with a synchronizing feedback loop therein. It also has a replica delay element coupled with the synchronizing feedback loop and adapted to provide feedback delay substantially replicating the predetermined output data delay, the replica delay element causing the predictive time base generator to provide a predictive clock signal to the data delay element and substantially reducing the predetermined output data delay and wherein the computer bus and the multiprotocol bus interface adapter are adapted to employ a PCI protocol, a PCI-X protocol, or both. An embodiment of the present invention may further include a management bus controller coupled with the multiprotocol bus interface adapter. The management bus controller is adapted to monitor and manage preselected components coupled with one of the communication network and the computer bus. The management bus controlled is adapted to employ at least one of an Alert Standard Format (ASF) specification protocol, a System Management Bus (SMBus) specification protocol, an Intelligent Platform Management Interface (IPMI) specification protocol, and a Simple Network Management Protocol (SNMP). The invention also can include a 10/100/1000BASE-T IEEE Std. 802.3-compliant transceiver and media access controller (MAC) coupled with the communication network; a buffer memory coupled with the MAC, wherein the buffer memory includes one of a packet buffer memory, a frame buffer memory, a queue memory, or a combination thereof; and CPU, which may be used to transmit—in addition to other functions, and a CPU, which may be used to receive—in addition to other functions, coupled with the multiprotocol bus interface adapter and the management bus controller. The multiprotocol computer bus interface adapter, the management bus controller, or both can include at least one of a Gigabit Media Independent Interface (GMII) interface, an 10-Gigabit Media Independent Interface (XGMII), a 10-Gigabit attachment unit interface), XSBI (10-Gigabit serial bus interface (XAUI), a Serial Gigabit Media Independent Interface (SGMII), a Reduced Gigabit Media Independent Interface (RGMII), a Reduced Ten Bit Interface (RTBI), a Ten-Bit Interface (TBI), a Serial Gigabit Media Independent Interface (SMII), and a Media Independent Interface (MII). Also, the multiprotocol bus interface adapter is suited to interface one of an IEEE Std. 802.3-like protocol, a SONET/SDH-like protocol, a Fiber-Channel-like protocol, an SCSI-like protocol, and an InfiniBand-like protocol. Also, the predictive interface adapter may be a multiprotocol predictive interface adapter that can accommodate multiple computer bus protocols, including the PCI local bus protocol and the PCI-X local bus protocol, as well as similar bus protocols such as, for example, the CardBus protocol. Furthermore, local bus adapter/controller can be adapted to additionally accommodate at least one of the Alert Standard Format (ASF) specification protocol, the System Management Bus (SMBus) specification protocol, the Intelligent Platform Management Interface (IPMI) specification protocol, and the Simple Network Management Protocol (SNMP). In certain embodiments of the present invention, the network controller can be realized in a single-chip VLSI implementation, for example, an 0.18 micron CMOS VLSI implementation, which can be particularly advantageous for application of these embodiments to Gigabit Ethernet Network Interface cards and LAN-on-Motherboard (LOM) systems.

BRIEF DESCRIPTION OF THE DRAWINGS

These and other features, aspects and advantages of the present invention will be more fully understood when considered with respect to the following detailed description, appended claims and accompanying drawings, wherein:

DESCRIPTION OF THE EMBODIMENTS

The present invention implements an advanced, high-performance, high-bandwidth, highly-integrated controller, such as an Integrated Gigabit Ethernet PCI-X Controller, that integrates complex network communication, management, and support features and functions onto a single VLSI chip. Embodiments of the invention can be configured as a network controller, which is coupled between a communication network and a computer bus, and which incorporates a multiprotocol bus interface adapter and a alert supervisory bus controller.

To meet stringent timing requirements, whether in a computer bus interface adapter, or in another high-performance digital environment, the present invention provides a predictive time base generator that produces a predictive clock signal, typically advanced in time relative to an input clock signal, which can compensate for elements producing delays in a data path, a clock path, or both. It will be apparent to the skilled practitioner that the predictive time base generator of the present invention can be employed to compensate for critical path delays in applications other than computer bus interface adapters as well, and it is intended that the scope of the present invention include such applications. For example, within the domain of IEEE Std. 802.3-related network adapters, the predictive time base generator of the present invention can be employed advantageously in a myriad of interfaces including, without limitation, XGMII (10-Gigabit Media Independent Interface), XAUI (10-Gigabit attachment unit interface), XSBI (10-Gigabit serial bus interface), SGMII (Serial Gigabit Media Independent Interface), RGMII (Reduced Gigabit Media Independent Interface), RTBI (Reduced Ten Bit Interface), GMII (Gigabit Media Independent Interface), as well as in TBI, SMII, and MII interfaces. IEEE Std. 802.3, 2000 Edition, *CSMA/CD Access Method and Physical Layer Specifications*, relevant to such implementations, is hereby incorporated herein in its entirety.

Figure 1:
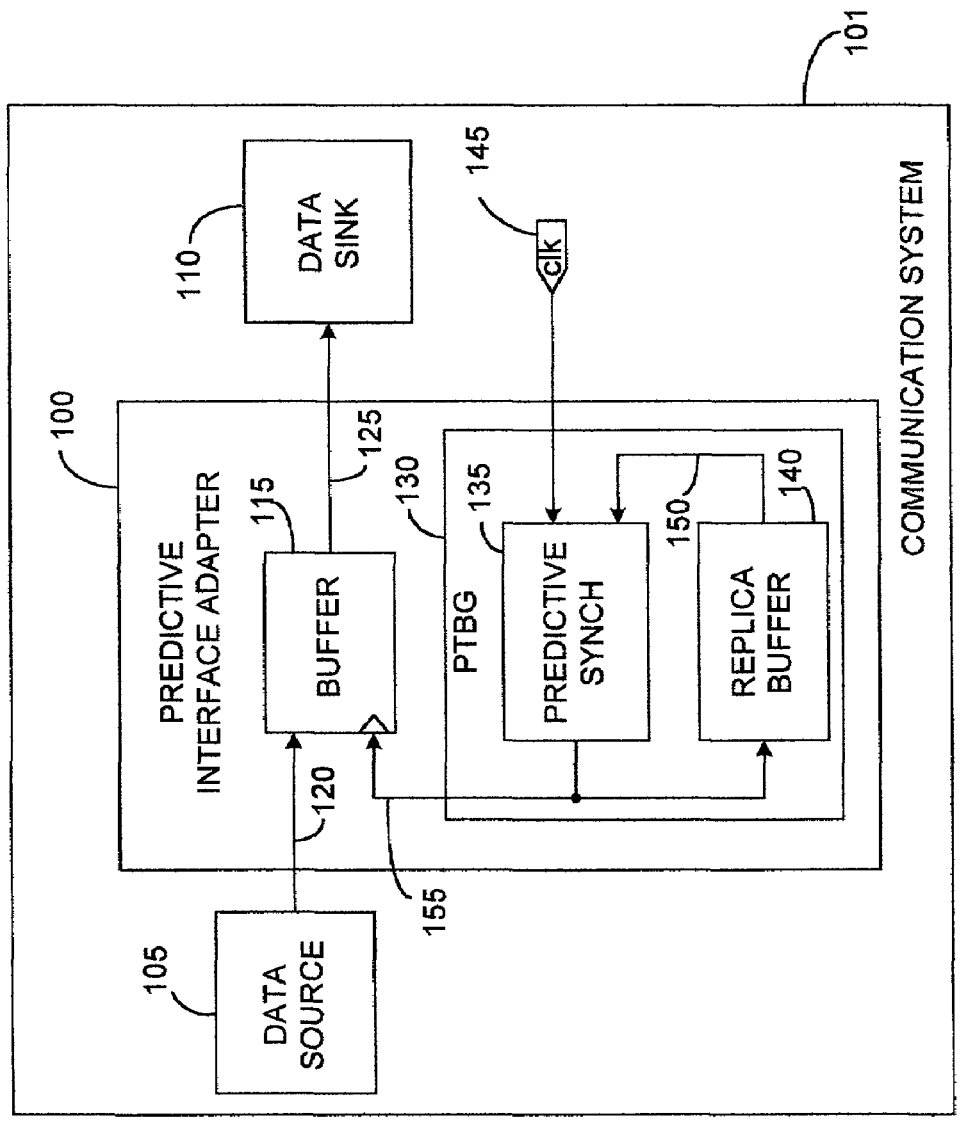
FIG. 1 is a block schematic of an embodiment of a predictive time base generator according to the present invention, in the context of a predictive interface adapter for a computer bus.

FIG. 1 illustrates one embodiment of the invention herein, in which predictive interface adapter (PIA) 100 is interposed in data path 120, 125 between data source 105, and data sink 110, of communication system 101. PIA 100 can include a data delay element, here buffer 115, and predictive time base generator (PTBG) 130. For purposes of illustration, the relevant preselected edge of clock signal 145 will be defined as the arriving rising edge. Assuming valid data is available on data output path 120, prior to the arriving edge of clock signal 145, direct clocking of buffer 115 by input clock signal 145 would impose a delay upon data propagating through buffer 115 from data path 120 to data path 125. In this case, the period between the arriving rising edge of clock signal 145 to valid data out on path 125 would be extended by the predetermined data delay through delay element 115. On the other hand, by providing an early clock signal, relative to the rising edge of clock signal 145, buffer 115 can be clocked after data is valid on data path 120 but before the actual arrival of the rising edge of clock signal 145, substantially nullifying the predetermined data delay, and minimizing the period between the rising edge of clock signal 145 to valid data out on data path 125.

In order to provide such an early clock signal, PTBG 130 provides a predictive clock signal 155 to buffer 115. PTBG 130, according to the present invention, can include a predictive synchronizer 135, which receives input clock signal 145 and, through, delay feedback 150, produces signal 155 substantially locked with, but advanced relative to, clock input signal 145. In general, it is preferred that synchronizer 135 be a phase lock loop (PLL), although a delay lock loop (DLL) also may be used. By inserting replica delay element 140 between synchronizer output 155 and delay feedback 150, synchronizer 135 can lock with input clock signal 145 such that predictive signal 155 is advanced, relative to signal 145, by an amount of time substantially replicating the predetermined data delay imposed by delay element 115. Thus, valid data can be made available on path 125 essentially simultaneously with the arriving rising edge of clock signal 145, and PTBG 130 assists with data synchronization as well as providing a predictive timing signal. It is generally preferred to replicate the structure(s) inducing the critical data path delay within replica delay element 140, in order to obtain an accurate and robust approximation of the predetermined data delay. Advantageously, the approximation of the predetermined data delay thus obtained is largely unaffected by variations in design and fabrication processes, operating environment, and the like.

Figure 2:
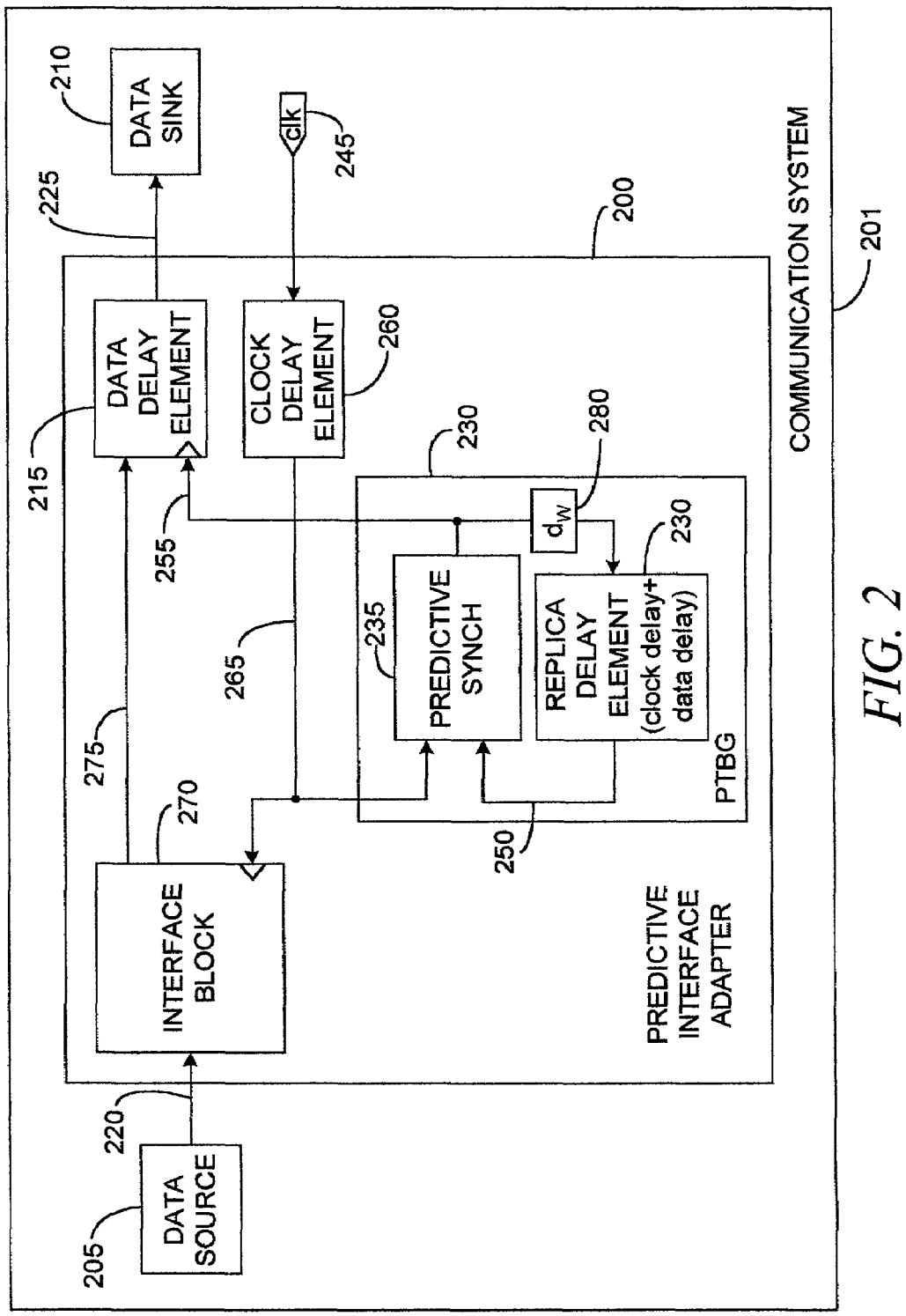
FIG. 2 is a block schematic of an another embodiment of a predictive time base generator according to the present invention.

In many applications, a data path delay can be accompanied by a clock-related delay, for example, a clock tree delay. Thus, PIA 200 in FIG. 2 is adapted to additionally compensate for clock-related delays in internal clock path producing delayed clock signal 265. Similar to the structure and function described with regard to FIG. 1, PIA 200 is interposed between data source 205 and data sink 210, in communication system 201. PIA 200 includes PTBG 230, which provides predictive clock signal 255 to data delay element 215. As before, a predetermined data delay exists within PIA 200, as indicated by data delay element 215.

However, in PIA 200, an additional source of delay is encountered, namely, a predetermined clock delay in the propagation of input clock signal 245, which clock delay is modeled by clock delay element 260. In order to compensate for both types of delays, it is desirable to adapt replica delay element 230, which is coupled with delay feedback 250, to replicate therein both data delay element 215 and clock delay element 260. In this manner, predictive synchronizer 235 produces predictive clock signal 255 advanced in time, relative to input clock signal 245, to substantially nullify both the predetermined data delay and the predetermined clock delay.

In operation, interface block 270 receives data on data path 220 from data source 205. This data is made available on data path 275 to data delay element 215 before the arrival of the preselected (e.g., rising) edge of input clock signal 245. Were data delay element 215 to be clocked by delayed clock signal 265, the resultant delay from clock 245 to valid data out on data path 225 would be approximately the sum of the predetermined data delay and the predetermined clock delay. Because the clock-to-valid-output-data delay is typically one of the most difficult timing constraints to meet in such a device, direct clocking by delayed clock signal 265 may cause a standard interface adapter to violate, or undesirably approach, the relevant timing restriction. Thus, it is preferred that predictive clock signal 255 clocks data delay element 215 in advance of the arrival of input clock signal 245 such that valid data is available on data path 225 at, or desirably near, the arrival of the rising edge of input clock signal 245 to PIA 200.

In the event that wire delays represent significant components in the data delay, the clock delay, or both, a compensatory replica wire delay element 280, corresponding to the undesirable wire delays, can be incorporated with delay element 230 in the path of feedback delay 250. Moreover, interface block 270 can be a component that selectively transfers data in a manner suitable to one or more computer bus protocols, and thus PIA 200 can be a multi-protocol predictive interface adapter.

The embodiments of the present invention illustrated in FIG. 1 and FIG. 2 can be used in a variety of devices in which it is desired to reduce the effects of signal propagation delay, for example, in a computer network or in a computer system. Such computer network components, for example, network time synchronizers and Serializer-Deserializers (SERDES), can be adapted for applications related to exemplary networking protocols including, without limitation, Ethernet, SONET/SDH, Fibre Channel, Ultra3 SCSI, InfiniBand, and the like.

Certain preferred embodiments of the invention herein can be especially advantageous when used in conjunction with particular computer bus interface adapters, particularly where multiple bus protocols are employed. Such an application can based, for example, on the Peripheral Component Interconnect (PCI) Local Bus specification and its subsequent enhancements. A skilled artisan would realize, however, that the present invention also can readily be adapted for bus implementations similar to the PCI Local Bus, including, without limitation, CardBus implementations. CardBus is a 32-bit bus mastering interface defined by the PC Card Standard, Release 8, March 1997, and by the *PCI to PCMCIA CardBus Bridge Register Description* (Yenta specification—Intel Corporation) which standards are incorporated herein in their entirety.

It will be useful to briefly describe the PCI bus family of protocols in order to inform the subsequent descriptions of additional embodiments of the invention, as realized in the context of the PCI/PCI-X bus protocols. The PCI specification was introduced to define a low-latency path between the microprocessor local bus and faster peripherals, such as high-resolution video boards, disk controllers, and LAN devices. The original PCI bus specification (PCI33) defines a 33 MHz, 32-bit or 64-bit data path to achieve a bandwidth of about 133 Mbps. Later, the 66 MHz PCI (PCI66) bus was introduced as a compatible superset of PCI33. A PCI66 bus operates up to a maximum clock speed of 66 MHz, also using a 32-bit or 64-bit data path, providing a peak bandwidth of about 533 megabytes per second (MB/s). Differences between the PCI33 bus and the PCI66 bus are minimal: PCI66 utilizes the PCI33 bus protocol, signal definitions, and connector layout, and simply operates at a higher maximum bus clock frequency. The PCI66 bus is specified to be interoperable with the PCI33 bus; a PCI66 device operates as a PCI33 device when it is connected to a 33 MHz PCI bus. Similarly, if any PCI33 devices are connected to a PCI66 bus, the PCI66 bus operates as if it were a PCI33 bus. PCI33 devices are specified to operate between 0–33 MHz and PCI66 devices between 33–66 MHz.

However, despite the advantages of the PCI66 protocol, business-critical applications continue to demand greater bandwidth, and shorter response times, from the input/output (I/O) subsystems of enterprise computers. Faster and more complex I/O devices such as Gigabit Ethernet, Fibre Channel, Ultra3 SCSI, and multi-port network interface controllers (NICs) can demand far greater bandwidth than PCI33, or PCI66, can provide. For example, a four-port Gigabit Ethernet NIC, with each port capable of 1 gigabit-per-second, or 125 MB/s, of sustained throughput would overwhelm the 64-bit, 66-MHz PCI bus bandwidth by consuming essentially all available bandwidth. Thus, the conventional PCI bus technology can become a performance bottleneck. To break this I/O bottleneck, the PCI-X bus was developed as an enhancement of the industry-standard PCI bus.

Both PCI33 and PCI66 bus specifications (hereinafter, "conventional PCI") are described in detail in the *PCI Local Bus Specification, Revision* 2.2; the *PCI-to-PCI Bridge Architecture Specification, Revision* 1.1; the *PCI Power Management Interface Specification, Revision* 1.1; the PCI BIOS Specification, Revision 2.1, the *PCI Hot Plug Specification, Revision* 1.0; the *Mini PCI Specification, Revision* 1.0; and the *Small PCI Specification, Revision* 1.5aS; as amended, (collectively, "PCI Specification"). In addition, the PCI-X66 and PCI-X133 bus specifications are described in detail in the *PCI-X Addendum To The PCI Local Bus Specification, Revision* 1.0a, as amended ("PCI-X Specification"), in addition to pertinent parts of the PCI Specification. The foregoing specifications are incorporated by reference in their respective entireties herein.

PCI-X technology can increase bus capacity to more than eight times the conventional PCI bus bandwidth—from 133 MB/s with the 32-bit, 33 MHz PCI bus, to 1066 MB/s with the 64-bit, 133 MHz PCI-X bus. PCI-X enables the design of systems and devices that can operate at bus frequencies of up to 133 MHz using a 64-bit bus width, a significant improvement in performance beyond that of conventional PCI systems. The PCI-X specification defines two frequency design points, and two data path widths, for PCI-X adapters: PCI-X66 MHz and PCI-X 133 MHz, each capable of having 32-bit or 64-bit data paths. When operating in PCI-X mode, PCI-X66 adapters can have actual clock frequencies ranging from 50 to 66 MHz, and PCI-X133 adapters can have clock frequencies ranging from 50 to 133 MHz.

In general, PCI-X provides backward compatibility with conventional PCI bus designs at both the adapter and system level. Devices can be designed to meet PCI-X66 and PCI-X133 requirements, yet operate as conventional PCI33 and PCI66 devices when installed in those systems. Conversely, if conventional PCI devices are installed on a PCI-X bus, the bus clock remains at a frequency acceptable to the conventional adapter, and other adapters on that bus segment are restricted to using the conventional PCI protocol. If only PCI-X devices are installed on a PCI-X bus, that bus segment can operate using the PCI-X protocol. However, despite backward compatibility, there are fundamental differences between the PCI and PCI-X protocols that pose challenges to the design of PCI-X133 adapters which yield maximum bandwidth in a PCI-X133 environment, yet are fully functional as PCI33 devices in a 33 MHz signaling environment. A key difference relates to the disparate natures of PCI and PCI-X bus transactions, which are described presently.

In PCI terminology, a requester is a requesting device and a target is the device that responds to that request. The fundamental unit of information transfer is a transaction, which is a combination of address, data, and bus turn-around phases occurring between requester and target. A sequence is one or more transactions associated with carrying out a single logical transfer by a requester. A delayed transaction is a transaction in which one or more wait states are inserted by requester or target devices. The PCI-X protocol does not implement delayed transactions.

Typically, each conventional PCI transaction takes three overhead cycles, and a variable number of data cycles, to complete, including a bus turn-around cycle. The conventional PCI protocol implements an immediate protocol, in which, during the first clock cycle of the PCI transaction, the requester propagates across the bus an address signal that all potential targets must immediately decode in order to decide which target is to respond, with the actual target device responding to the requester by the next clock cycle. During subsequent cycles, the data phase is executed, with the requester constantly polling the target to determine whether the data phase has completed. If it has not, then the requester or target inserts one or more wait states into the transaction to "stall" the bus until the transaction is completed, which can slow bus throughput dramatically. Finally, the bus turn-around phase is executed and the PCI bus is released for another transaction.

Of the 30-ns PCI33 clock cycle time, 7-ns are allocated during the first clock cycle for target device logic decoding, which usually is sufficient to permit a response by the next rising clock edge. However, for PCI66 designs, having a clock cycle time of 15 ns, target device logic decoding is reduced to 3 ns, making a device or adapter using the conventional PCI66 protocol difficult to implement.

The performance improvements realized by the PCI-X protocol are a result of two primary differences between conventional PCI and PCI-X: higher clock frequencies made possible by the register-to-register protocol, and new protocol enhancements such as the attribute phase and split transactions. Under the registered PCI-X protocol, the target receives in a register the signal sent by the requester during the first clock cycle. Unlike with an immediate protocol, the target is not required to respond to the requester until the rising edge of a subsequent clock cycle, thus allowing the target an entire clock cycle to decode the requester signal, and up to two clock cycles to respond.

Although the PCI-X registered protocol reduces certain timing constraints, PCI-X transactions nominally take four overhead cycles to complete the address, attribute, target response, and bus turn-around phases. The attribute phase optimizes system performance by including such properties as the byte count, bus number, and device number as part of the transaction; assists components optimize their performance during data transfers; and facilitates interfacing the PCI-X bus to packet-based systems, because the length of a transaction is communicated at the beginning of the transaction.

When a PCI-X device does not have data to transfer, it removes itself from the bus, so that another device can use the bus bandwidth. A split transaction is a sequence in which an initial transaction is sent defining action to be taken by the target, after which the bus is released until the target is ready to execute the transactions necessary to complete the sequence. By implementing split transactions, the PCI-X protocol advantageously eliminates the use of wait states, except for initial target latency, resulting in a more efficient use of bus and memory resources. Despite the clock cycle added to the basic PCI-X transaction, the actual time required to complete the transaction can be greatly reduced. For example, a transaction that takes nine cycles at 33 MHz will finish in about 270 ns, while a PCI-X transaction that takes ten cycles at 133 MHz will finish in about 75 ns, yielding a significant reduction in transaction time.

Due to the constraints imposed by the PCI immediate protocol, many designs for 66 MHz devices are preferred to be implemented using PCI-X66 protocol over the PCI66 protocol. However, despite the advantages of using the PCI-X protocol, pragmatic operational considerations make designing PCI-X133 devices quite difficult because stringent internal timing budgets must be strictly observed in order to operate at maximum throughput.

The relevant timing budget can be expressed by the equation:

$$T_{cyc} \geq T_{val} + T_{prop} + T_{su} + T_{skew}$$

where $T_{cyc}$ is the clock cycle time; $T_{val}$ is the clock (clk)-to-output-signal-valid delay; $T_{prop}$ is the signal propagation time across the bus; $T_{su}$ is the input setup time to CLK; and $T_{skew}$ is total clock tree skew time. For the most part, PCI, and especially PCI-X, designs are sensitive to critical path issues as manifested by $T_{val}$, because $T_{val}$ is a function of the internal paths within a PCI/PCI-X device. For example, a PCI device must meet a minimum $T_{val}$ value of 2.0 ns and a maximum value of 6 ns (PCI66) or 11 ns (PCI33). By contrast, for PCI-X devices, $T_{val}$ must meet a minimum value of 0.7 ns and a maximum value of 3.8 ns.

Although it is desirable to provide a multiprotocol computer bus interface adapter that meets both PCI and PCI-X requirements, a suitable PCI/PCI-X adapter is constrained both by the minimum PCI $T_{val}$ time (2.0 ns) and the maximum PCI-X $T_{val}$ time (3.8 ns). An additional constraint can be imposed by the technology in which the PCI-X device is realized, particularly in modern, deep-submicron CMOS processes. PCI/PCI-X devices are specified to use a nominal main power supply voltage, $V_{cc}$, of about 3.3V, yet deep-submicron devices often operate with a substantially lower $V_{cc}$. For example, a device fabricated under a 0.13 micron CMOS technology may employ a nominal $V_{cc}$ of about 1.2V; with 0.18 micron CMOS designs, the nominal $V_{cc}$ can be limited to about 1.8V. Thus, a device which gains the size, speed, and cost advantages of CMOS devices fabricated using deep submicron technology may need to employ voltage level shifting devices at the interface between the internal circuitry of the device, with a nominal $V_{cc}$ of, for example, 1.2V or 1.8V, and the external circuitry, which is exposed to the PCI/PCI-X signaling environment of 3.3V. Such voltage level shifting can add to critical path delays, which may lead to violation of the maximum PCI-X $T_{val}$ time.

In addition to predictive time base generator 130, 230, as described with regard to FIG. 1 and FIG. 2, respectively, the present invention also provides a multiprotocol computer bus interface adapter, fabricated using deep submicron CMOS processes, for example, an 0.18 micron CMOS fabrication process, which (1) satisfies the timing and voltage requirements of both the PCI and PCI-X specifications; (2) minimizes the impact on $T_{val}$ time; and (3) is robust to variations in design, fabrication processes, and environmental conditions.

Figure 3A:
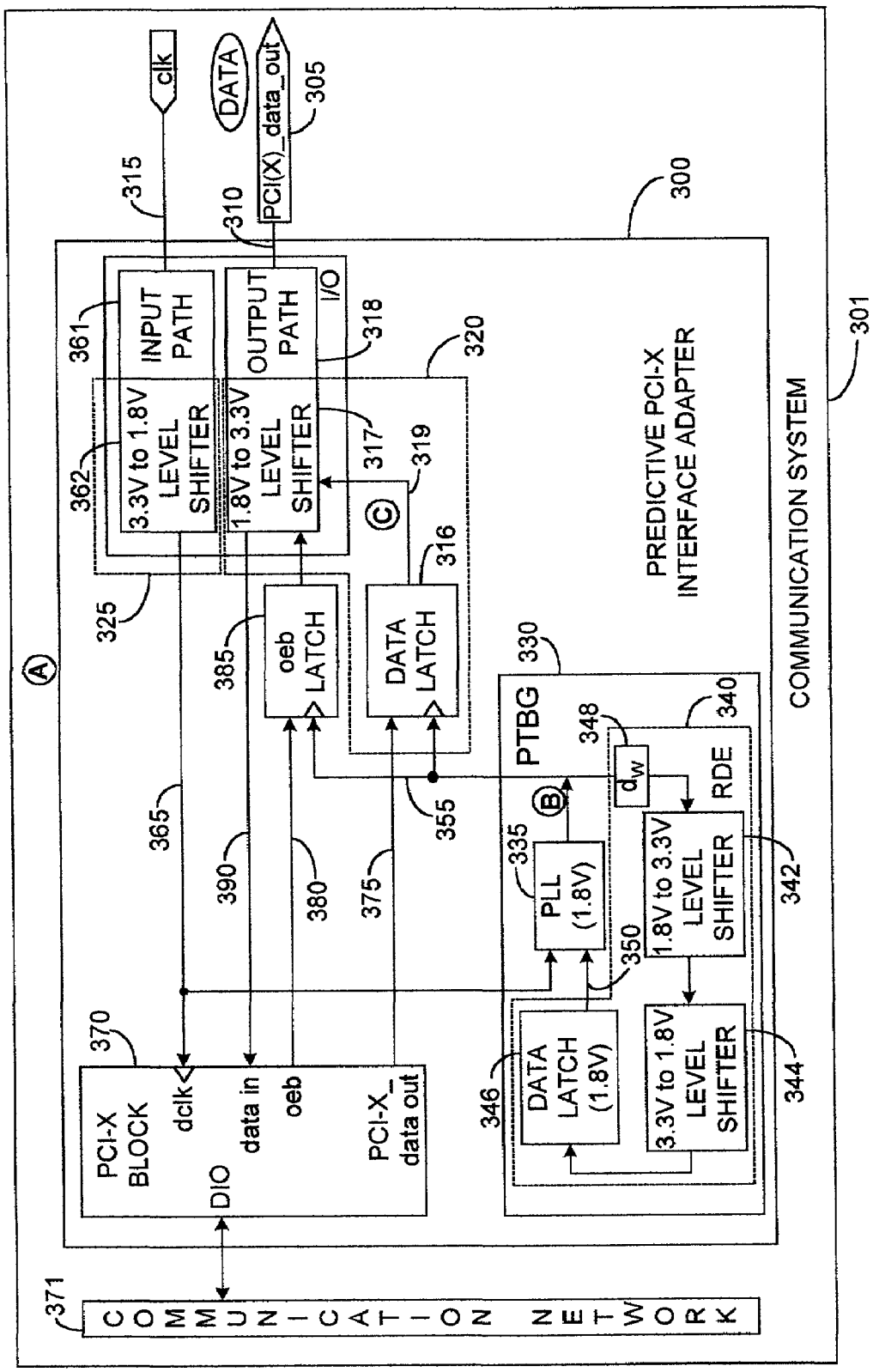
FIG. 3A is a block schematic of an embodiment of a PCI-X local bus predictive interface adapter employing a predictive time base generator, according to the present invention.

FIG. 3A illustrates an embodiment of the present invention in the form of predictive interface adapter 300, suitable for coupling with a PCI-X local bus, disposed within communication system 301, which adapter 300 includes PTBG 330, data delay element 320, and clock delay element 325. PIA 300 is disposed to bidirectionally communicate with a computer bus via PCI(X)_data_out 305, which bus employs the PCI-X protocol, the PCI protocol, or both. PCI-X block 370 can be separate from PIA 300 or, optionally, PCI-X block 370 can be included as part of PIA 300. In certain embodiments of the invention, PIA 300 can be adapted to bidirectionally communicate with communication network 371 in communication system 301, and may be coupled to network 371 by way of PCI-X block 370. Because PIA 300 is desired to be manufactured using a deep-submicron VLSI process, such as a 0.18 μm CMOS VLSI process, PIA 300 has a nominal internal operating voltage ($V_{cc}$) of about 1.8V, in contrast with the PCI-X nominal operating voltage of about 3.3 V. Thus, it is desirable to provide 3.3V-to-1.8V voltage level shifter 362 to reduce the incoming clock voltage from 3.3V to 1.8V. It likewise is desirable to up-shift the outgoing data voltage from 1.8V to 3.3V, using 1.8V-to-3.3V voltage level shifter 317. A disadvantage of employing voltage level shifters 317, 362 can be that they may account for at least a portion of the data delay and clock delay, respectively. To compensate for these delays, replica delay element 340 is provided within PTBG 330, and can include replica 1.8V-to-3.3V voltage level shifter 342, as well as replica 3.3V-to-1.8V voltage level shifter 344, in feedback delay path 350. Although the embodiment of FIG. 3A does not compensate for delays represented by input path 361 and output path 318 (e.g., arising from adapter 300 I/O pads), or delays due to internal wiring, such may be accommodated within replica delay element 340, if desired, for example, perhaps as part of wire delay element 348, along with any other wire delay for which compensation is intended. Similarly, clock tree delays in the critical signal paths, which may be a component of clock delay element 325, also could be incorporated into replica delay element 340. Output data latch 316 also is a portion of the critical delay path represented by data delay element 320 and, as such, it is desirable to include a corresponding replica delay element in the form of data latch 346 within replica delay element 340. Indeed, a skilled artisan would realize that, by incorporating into replica delay element 340 other replica delay elements corresponding to other delay components, the delays corresponding to these other delays also can be substantially reduced or nullified.

In PTBG 330, it is desired to employ a phase-locked loop (PLL) as predictive synchronizer 335, to create predictive clock signal 355, which assists synchronizing the availability of valid data on data output path 318 approximately at the moment when the preselected (preferably, rising) edge of input clock signal 315 arrives at input path 361. Alternatively, the predictive synchronizer can be realized using a delay-locked loop (DLL). Both PLLs and DLLs are well-known in the digital arts. PLL 335 generates a clock signal 355, responsive to delayed clock signal 365. As before, replica delay components 342, 344, 346, 348, constituting replica delay element 340, are interposed in feedback delay 350 of PLL 335 such that predictive clock signal 355 is produced in a manner that substantially nullifies the predetermined clock delay produced by clock delay element 325, and the predetermined data delay produced by data delay element 320. In PIA 300, interface block 370, as represented by a PCI-X interface block, makes data available on output path 375 in advance of input clock signal 315 arrival. The constituent components of PCI-X interface block 370 are well-known and, for the sake of clarity, will not be described further; the present invention contemplates embodiments both including and excluding PCI-X block 370.

PIA 300 can be a PCI/PCI-X target device, substantially conforming to the PCI-X local bus requirements and, thus, can have nearly two full clock cycles to respond to a requester's valid request. Therefore, the required data is usually available for transfer in advance of input clock signal 315. However, without PTBG 330, input clock signal 315 otherwise would be delayed by an amount equivalent to the delay induced by clock delay element 325 (i.e., level shifter 362 and any other clock-related delay presented) to produce delayed clock signal 365. Delayed clock signal 365 would then clock data latch 316 after the predetermined clock delay, and the data would then be valid at output path 318 after the critical path delay associated with data delay element 320. Thus, relative to the timing budget constraints of PCI/PCI-X protocols, $$T_{val} \geq T_{input\ path} + T_{clock\ delay} + T_{data\ delay} + T_{output\ path},$$

and the use of delayed clock signal 365 may produce a value for $T_{val}$ which exceeds, or comes unacceptably close to, maximum values for the clock-to-output-signal-valid delay, i.e., $T_{val}$, as defined in the relevant specification.

PTBG 330 produces clock signal 355 in a manner which predicts the arrival of the preselected (e.g., rising) edge of input clock signal 315, so that data from PCI-X block 370, is clocked through data latch 316, up-shifted in voltage by voltage level shifter 317, and available on PCI(X)_data_out 305, approximately at the moment the edge of input clock signal 315 rises to a preselected value, for example, to $V_{ih}$ (defined in the relevant PCI-X specification to be nominally about 0.5 $V_{cc}$). It also is desirable to clock oeb latch 385 concurrently with data latch 316, using predictive clock 355, so that operation of the two latches is substantially simultaneous. Because the use of replica delay element 340 in PTBG 330 substantially nullifies the predetermined clock delay and the predetermined data delay, such that the clock-to-output-signal-valid delay is approximately:

$$T_{val} \geq T_{input\ path} + T_{output\ path},$$

thereby substantially minimizing critical path delays induced by delay elements within PIA 300.

Figure 3B:
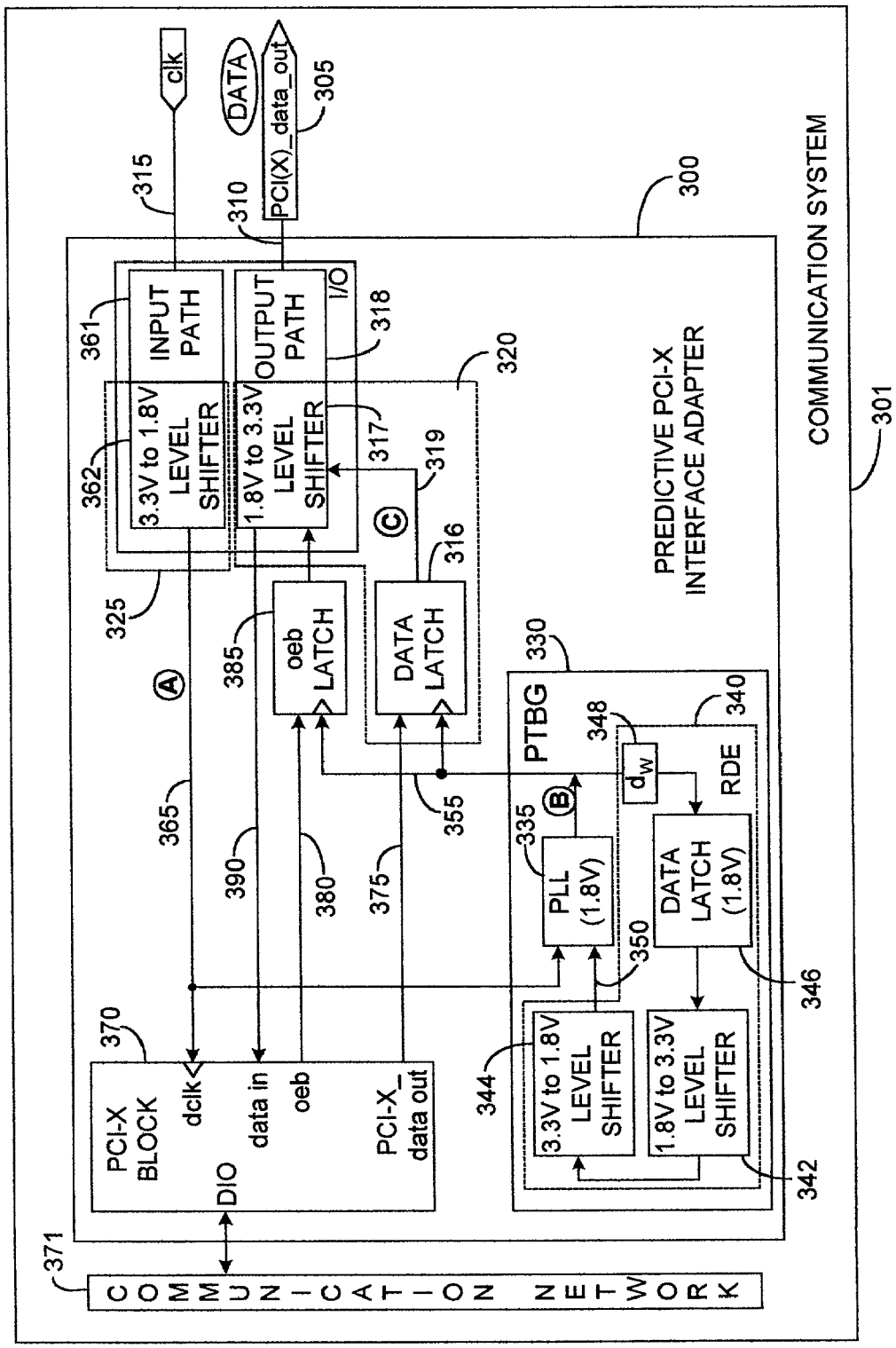
FIG. 3B is a block schematic of another embodiment of a PCI-X local bus predictive interface adapter employing a predictive time base generator, according to the present invention.

FIG. 3B illustrates an alternative embodiment of PIA 300, within communication system 301, such that the placement of voltage level shifters 342, 344 and data latch 346 are transposed in feedback delay path 350, in contrast to the placement of these replica delay elements in FIG. 3A. This alternative placement is illustrative of the notion that components within PTBG 330 may be arranged to provide a more efficient and compact VLSI footprint, if desirable.

Figure 4:
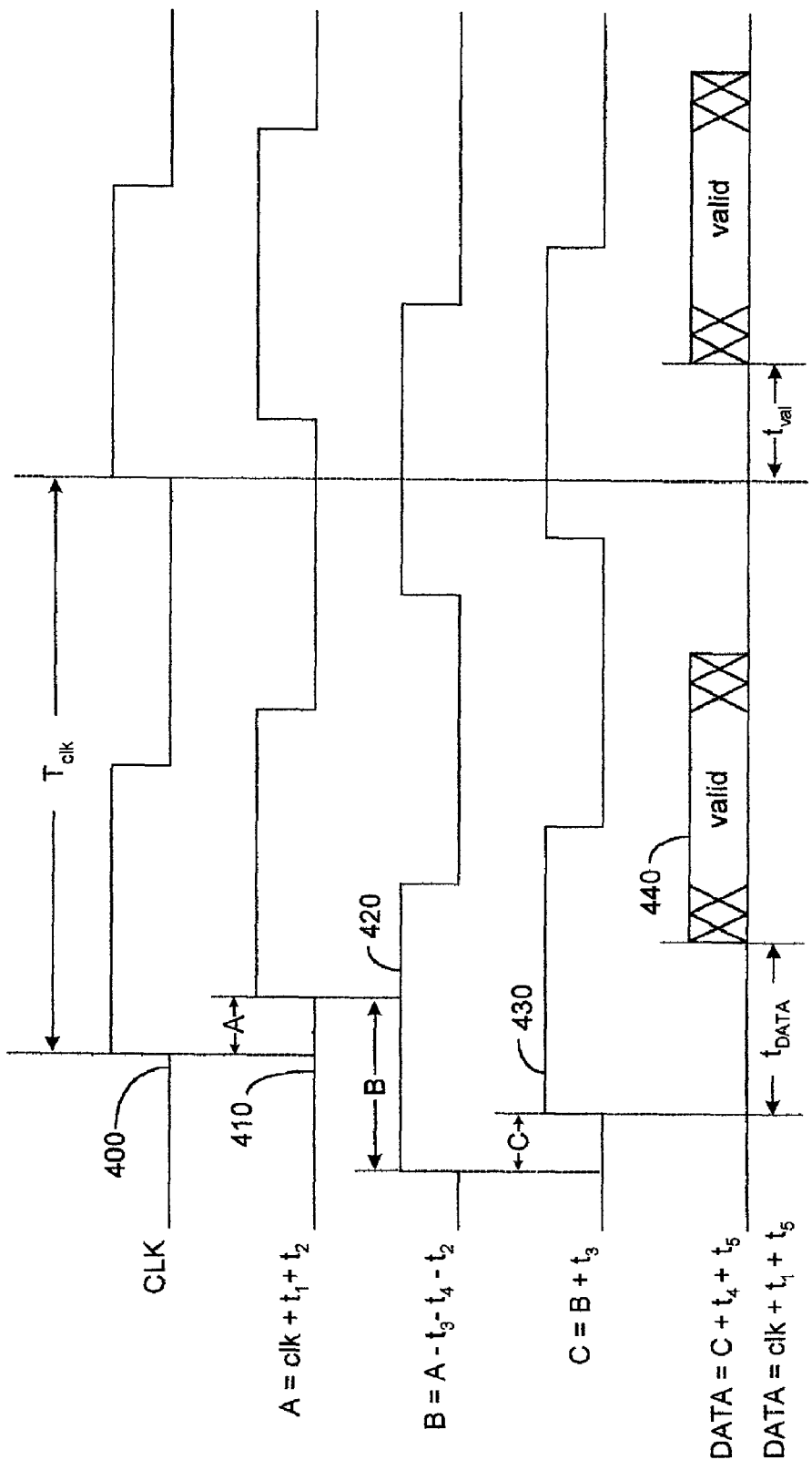
FIG. 4 is a simplified timing diagram illustrating timing characteristics of the predictive interface adapter in FIG. 3.

FIG. 4 illustrates the aforementioned timing principles in the context of FIG. 3A and FIG. 3B. In FIG. 4, CLK signal 400, is representative of input clock signal 315; signal A 410 is representative of delayed clock signal 365; signal B 420 is representative of predictive clock signal 355; signal C 430 is representative of output signal 319 traversing the output data delay element 320, at a point approximately between output data latch 316 and 1.8V-to-3.3V voltage level shifter 317; and signal DATA 440 is representative of the data signal available on data output 305, at a given time point. Also, time delays $t_1$ and $t_2$ are representative of the predetermined clock delay due to input path 361 and 3.3V-to-1.8V voltage level shifter 362, respectively. Thus, $t_{input\ delay} = t_1 + t_2$. Furthermore, time delays $t_3$, $t_4$, and $t_5$ are representative of the predetermined data delay due to output data latch 316 (and oeb latch 385); the delay due to 1.8V-to-3.3V voltage level shifter 317; and the delay due to output path 318, respectively. Thus, $t_{output\ delay} = t_3 + t_4 + t_5$. In order to properly advance predictive clock 355 (Signal B 420), this example includes replica delay elements in the feedback delay loop 350 of PTBG 330, such that Signal B 420=CLK signal 400−$(t_2+t_3+t_4)$. As before, the examples in FIGS. 3A, 3B, and 4 opt not to compensate for delays $t_1$ and $t_5$.

When CLK 400 arrives, signal A 410 is seen to be delayed by an amount equivalent to $t_1+t_2$. Signal B 420 then corresponds to predictive clock signal 355 arriving at data latch 316 (and oeb latch 385), advanced by an amount of time approximately equivalent to $t_2+t_3+t_4$. It is assumed that PCI-X block 370 has valid data on data path 375 by the arrival of the rising edge of signal 355. When clock signal 355 (i.e., signal B 420) clocks output data latch 316, output data on data path 375 propagates through latch 316 and arrives at path 319 approximately at the time signal C 430 rises. Thus, signal C 430 corresponds to signal B 420, as delayed by latch delay $t_3$. Despite the latch delay, signal C 430 nevertheless is advanced in time, relative to CLK 400, by an amount approximately equivalent to the delay $t_4$, arising from 1.8V-to-3.3V voltage level shifter 317. Once the data signal propagates through shifter 317, it becomes available as a valid DATA signal 400 (PCI(X)_data_out 305), after a delay approximately equivalent to the input path delay, $t_1$, plus the output path delay, $t_5$, or $T_{DATA}$=CLK+$t_1+t_5$. Therefore, the apparatus and method of the present invention substantially nullify the predetermined clock delay, as represented by $t_2$, and the predetermined data delay, as represented by $t_3+t_4$. If desired, the delays arising from the input path, $t_1$, and the output path, $t_5$, also could be included into the replica delay, such that $T_{DATA}$=CLK, i.e., the delays due to the PIA 300 are essentially transparent to the PCI-X bus.

Figure 5:
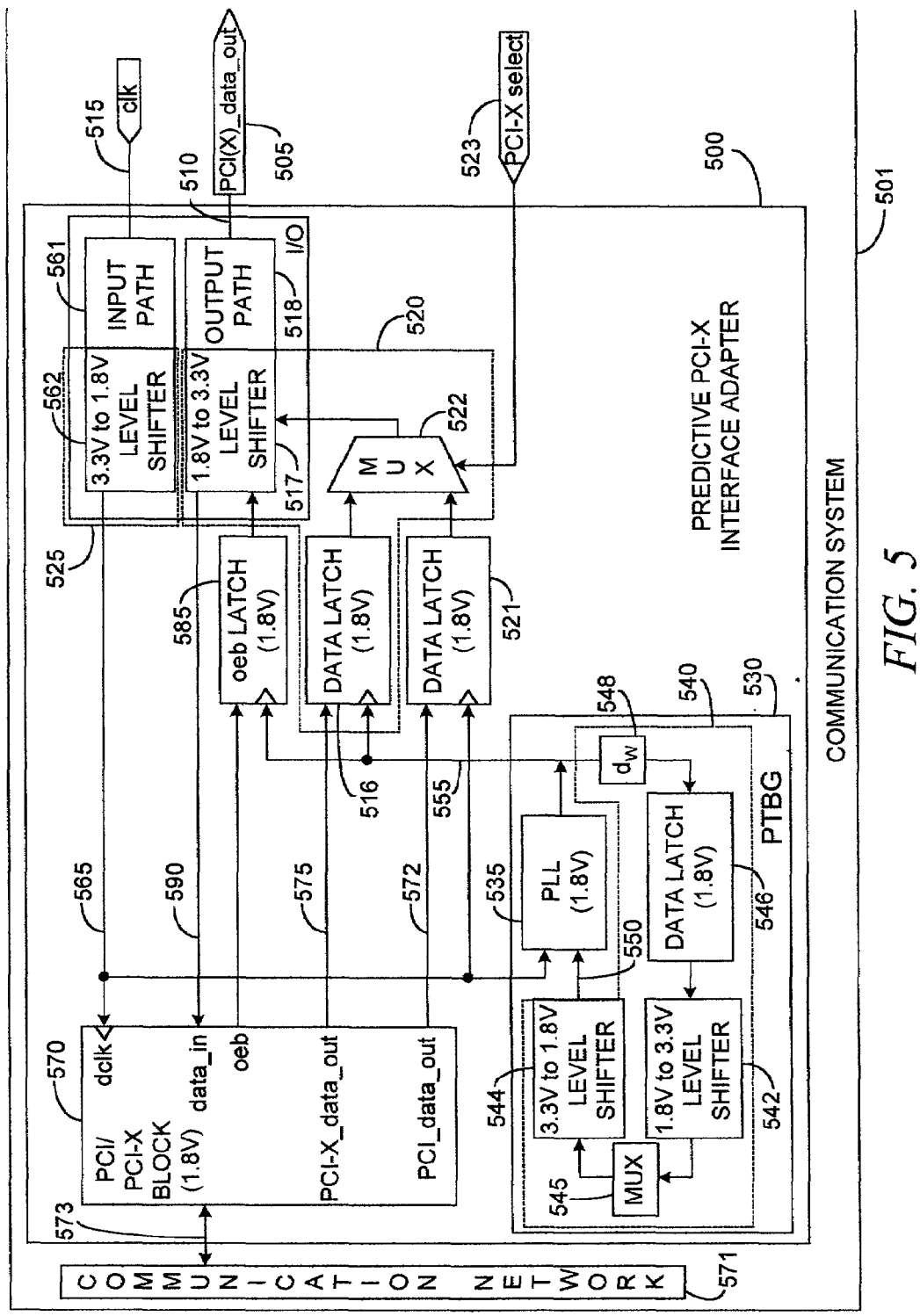
FIG. 5 is a block schematic of a embodiment of a multiprotocol PCI/PCI-X local bus predictive interface adapter employing a predictive time base generator, according to the present invention.

FIG. 5 illustrates yet another embodiment of the present invention in the form of predictive interface adapter 500.

PIA 500 is adapted to provide output data under both PCI and PCI-X protocols, thus PIA 500 is a multiprotocol computer bus interface adapter (MCBIA). MCBIA 500 is disposed to bidirectionally communicate with a computer bus via PCI(X)_data_out 505, which bus employs the PCI-X protocol, the PCI protocol, or both. PCI-X block 570 can be separate from MCBIA 500 or, optionally, PCI-X block 570 can be included as part of MCBIA 500. In certain embodiments of the invention, MCBIA 500 can be adapted to bidirectionally communicate with communication network 571 in communication system 501, and may be coupled to network 571 by way of PCI-X block 570. In general, operation of MCBIA 500 can be similar to that of PIA 300 in FIG. 3, with the addition of data latch 521, for buffering data under the PCI protocol (in which time-delay compensation may not be employed); and of multiplexer 522, for selecting whether signal PCI_data_Out 572, or signal PCI (X)_data_out 575, is transferred to PCI(X)_data_out 505, responsive to PCI-X_select signal 523. Because multiplexer 522 is added to data delay element 520 for the transfer of PCI-X_data_out 575, it is desirable to add a replica multiplexer 545 to replica delay element 540. Furthermore, MCBIA 500 is similar to PIA 100 in FIG. 1 and PIA 200 in FIG. 2, in that a predictive time base generator is included in each of the aforementioned adapters.

Under the conventional PCI protocol, it may not be desirable to use predictive clock signal 555 from PTBG 530 but, instead use delayed clock signal 565. Indeed, for PCI33-compatible operation, the use of a PLL is generally discouraged because, under the conventional PCI33 protocol, (1) clock speeds are allowed to change on-the-fly, and (2) frequencies are allowed to drop down to 0 (zero) MHz, with either operation being generally incompatible with PLL operation. Also, it may be unnecessary to employ PTBG 530 for 66 MHz signals. After arrival, signal CLK 515 traverses input path 561 as well as 3.3V-to-1.8V voltage level shifter 562 becoming delayed clock signal 565. Signal 565 triggers PCI/PCI-X block 570 to provide data under the PCI protocol using PCI_data_out data path 572. Delayed clock signal 565 clocks the PCI data through data latch 521 whose output 572, due to the de-assertion of PCI-X_select signal 523, is selected by MUX 522 for transfer to PCI(X)_data_out 505, via level shifter 517 and data path 518, due to PCI-X_select signal 523 being unasserted.

Under the PCI-X protocol, particularly during PCI-X133 operations, PCI-X_select signal 523 is asserted such that predictive clock signal 555 clocks PCI-X_data_out 575 into data latch 516 in advance of CLK 515. In this case, the output of latch 516 is selected by MUX 522 for transfer as valid output data to PCI(X)_data_out 505, after traversing voltage level shifter 518 and output path 518, being available approximately at the time when CLK signal 515 arrives as a rising edge signal. The ability to select between standard PCI and advanced PCI-X, thereby selectively employing PTBG 530 to provide a predictive clock signal, advantageously positions MCBIA 500 as a multiprotocol computer bus interface adapter, capable of operating under the PCI-X protocol up to 133 MHz or, under the PCI protocol, down to zero MHz, thus allowing computer bus interface adapters according to the present invention to be fully compatible with a vast array of devices, bridges, and boards already designed under long-standing PCI protocol, as well as those yet to be designed under the PCI-X enhancement.

In addition, it may be desirable to provide, for example, a PCI-X Bridge block in place of PCI-X block 570, such that communication network 571 is configured to be a second PCI/PCI-X bus. In such a case, it might be desirable to implement a second PTBG 530 (not shown) in communication with the appropriate I/O and clock signals on bus 573, with second PTBG 530 (not shown) having suitable replica delays therein, so that clock and data delays on signals from bus 573 are substantially nullified thereby. Moreover, a skilled artisan would realize that MCBIA 500, including PTBG 530, also can be adapted for use in other bus protocol applications where it is desired to compensate for delays which may be introduced by circuitry used to dispose an adapter, similar to MCBIA 500, for operations under multiple bus protocol timing, voltage, and operational requirements.

Figure 6:
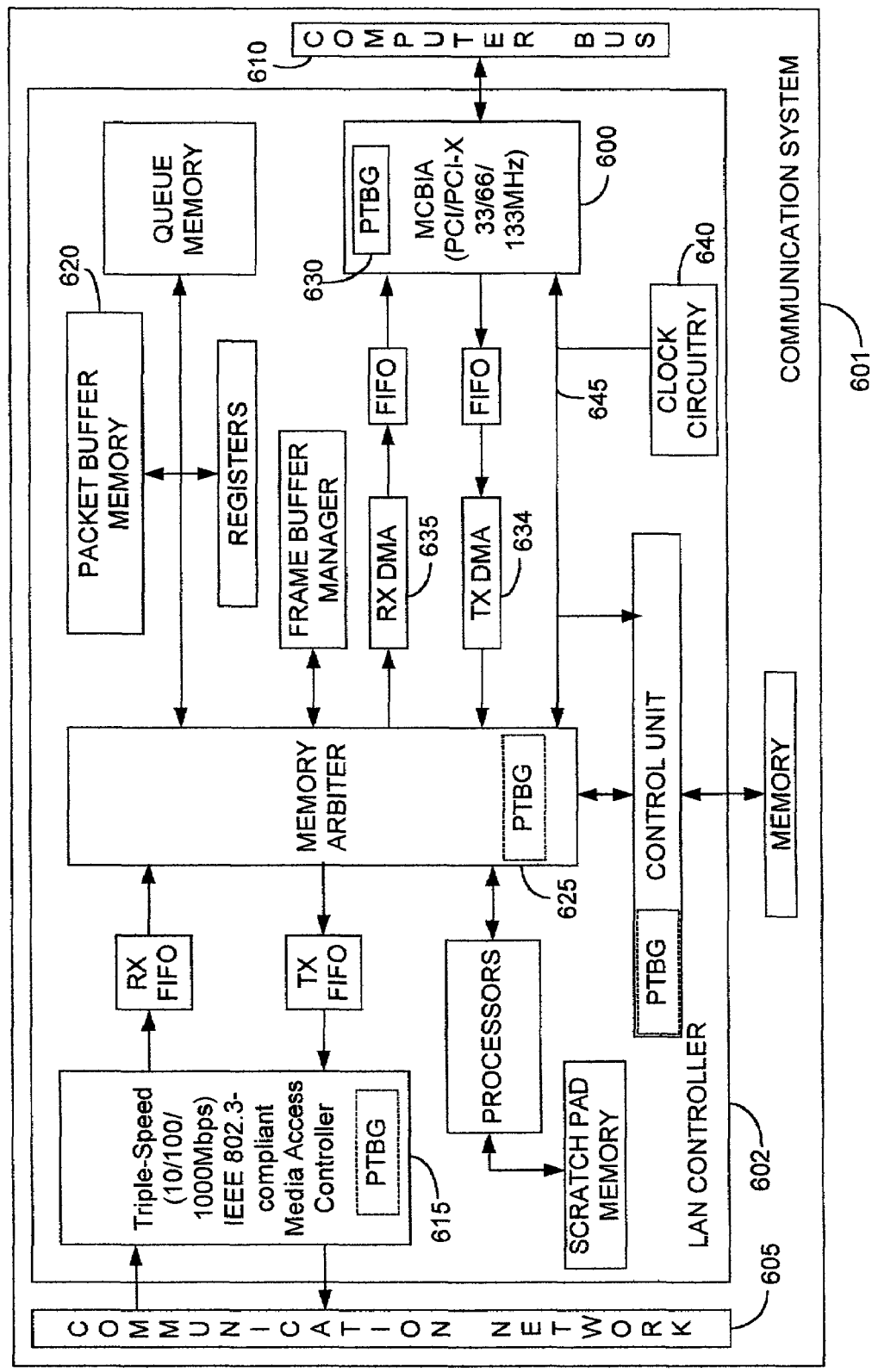
FIG. 6 is a simplified block schematic of a local area network controller, according to the present invention.

FIG. 6 is an illustration of the multiprotocol computer bus interface adapter 600 (MCBIA), as implemented within a highly-integrated 10/100/1000BASE-T Ethernet LAN controller 602. MCBIA 600 is similar to predictive PCI-X Interface Adapter 300 in FIGS. 3A and 3B, and to MCBIA 500 in FIG. 5. Controller 602 within communication system 601 (shown in simplified form for clarity) is optimized for NIC and LOM applications, and combines a 10/100/1000BASE-T IEEE 802.3-compliant Media Access Controller (MAC) 615, multiprotocol computer bus interface adapter 600, and on-chip packet buffer memory 620 in a single device. Within the context of LAN controller 602, MCBIA 600 can facilitate communication between network 605 and PCI/PCI-X computer bus 610. An exemplary data signal from computer bus 610 can be received by MCBIA 600 and transferred to TX DMA 634, which data signal is communicated through memory arbiter 625 to transmit circuitry within MAC 615 and, then, to network 605. Similarly, an exemplary data signal from network 605 can be received by receive circuitry in MAC 615, which data signal is communicated through memory arbiter 625 to RX DMA 635 and, then, to computer bus 610 via MCBIA 600. In addition, MCBIA 600 can accommodate bidirectional PCI/PCI-X data transfers localized to computer bus 610, as illustrated with regard to the PCI/PCI-X operations in FIGS. 3A, 3B, and 5. In general, MCBIA 600 is adapted to compensate for clock delays introduced to clock signal 645, as received from clock circuitry 640, and data delays introduced into data communicated with computer bus 610, and includes PTBG 630, similar to PTBG 130, 230, 330, 530, in FIGS. 1, 2, 3A & 3B, and 5, respectively. MCBIA 600 also may include replica delay circuitry that substantially nullifies other delays such as, for example, selected delays introduced by MAC 615, arbiter 625, TX/RX DMA 634, 635, respectively, and the like, however, such is not required to practice the present invention. It also may be desirable to employ a predictive time base generator, such as PTBG 630, or other PTBG according to the present invention, within MAC 615, arbiter 625, or other preselected locations within LAN controller 602.

Figure 7:
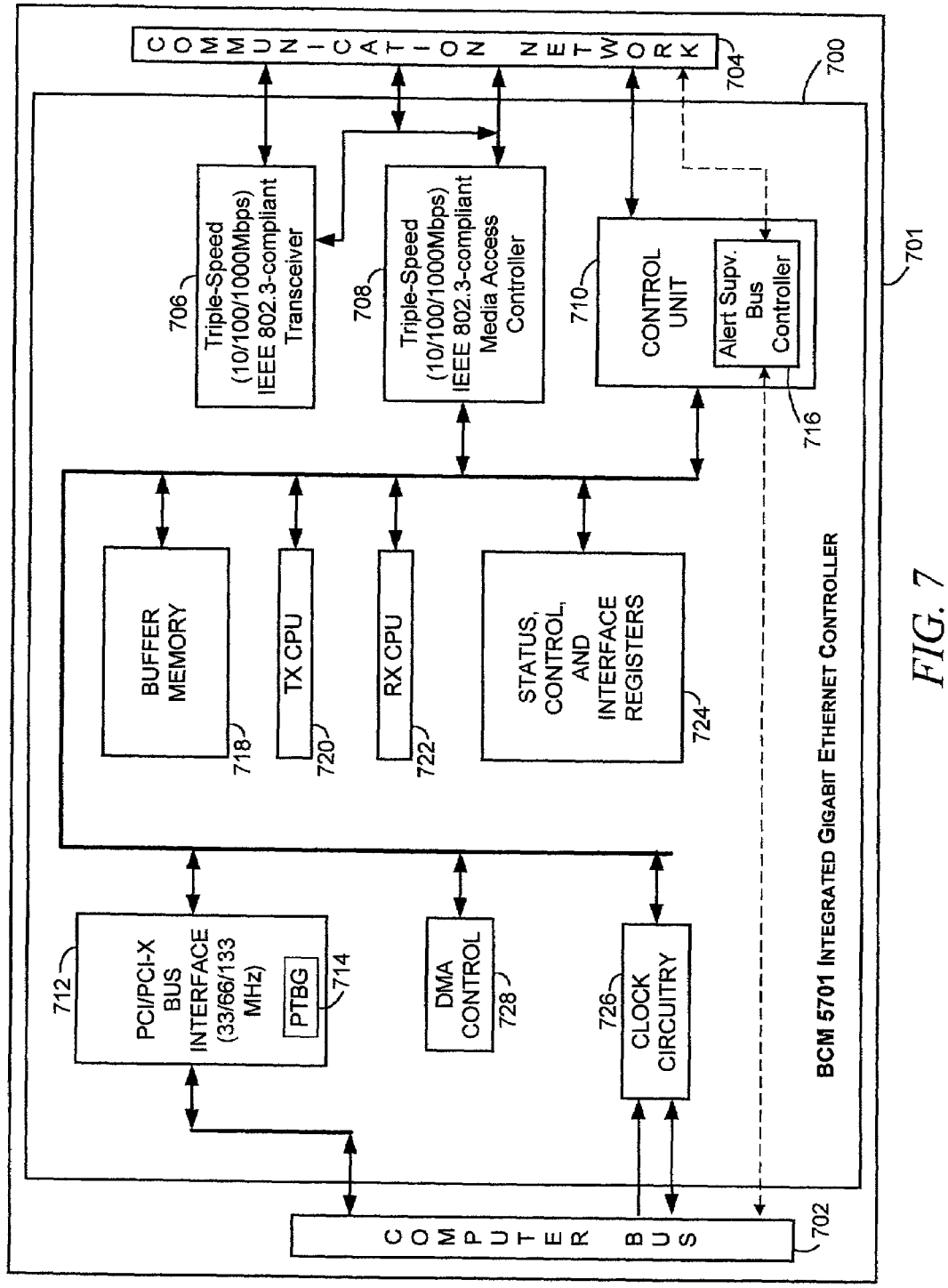
FIG. 7 is a simplified block schematic of an integrated, high-bandwidth local area network controller, according to the present invention.

FIG. 7 illustrates controller 700 which is adapted to accommodate at least one protocol intended to effect management functionality, in addition to the aforementioned PCI/PCI-X host protocols. Controller 700 may be part of communication system 701. Such management functionality can include sensor, alert, corrective action, power management, and system control functionality, for example, alerting and remote control interfaces that monitor and manage networked devices, including sensors, power-related devices, inventory EPROMS, communications devices, system servers, operating systems and management platforms, to be proactively managed, whether or not an operating system is present in the particular device; interfaces that monitor and manage network/system parameters and can selectively power up, power down, or reboot one or more computers on a network; and interfaces that monitor and manage elements such as system temperatures, voltages, fans, power supplies, bus errors, system physical security, etc. Thus, in certain embodiments of the present invention, it is preferred to couple multiprotocol computer bus interface adapter (MCBIA) 712, which may include a predictive time base generator 714, with Alert Supervisory Bus Controller 716, which is adapted to communicate via a supervisory bus using one or more protocols suitable for desired management functionality. The supervisory bus may be integrated with, or distinct from, computer bus 702, communication network 704, or a combination thereof.

Aspects of such management functionality can be defined, for example, by the Alert Standard Format (ASF) specification protocol, the System Management Bus (SMBus) specification protocol, Advanced Configuration and Power Interface Specification (ACPI) protocol, the Intelligent Platform Management Interface (IPMI) specification protocol, and the Simple Network Management Protocol (SNMP), as well as pertinent documents related thereto. The ASF specification protocol is defined in detail in The Distributed Management Task Force specification, *Alert Standard Format Specification, Version* 1.03, Jun. 20, 2001 (as amended). The SMBus protocol, architecture, and interface descriptions are defined in detail in the SBS Implementers Forum specification, *System Management Bus Specification, Version* 2.0, Aug. 3, 2000 (as amended); the PCISIG Forum document *PCI Engineering Change Notice to PCI Local Bus Specification, Revision* 2.2—*Addition of the SMBus to the PCI Connector*, Oct. 5, 2000; and the *Advanced Configuration and Power Interface Specification, Revision* 2.0, Jul. 27, 2000. The IPMI protocol is defined in detail in *Intelligent Platform Management Interface (IPMI) specification, Version* 1.5, Revision 1.0 (as amended) developed by a consortium including Intel Corporation, Hewlett-Packard Company, NEC Corporation, and Dell Computer Corporation. Also, the Simple Network Management Protocol (SNMP) is defined in detail, for example, in the IETF RFC documents *RFC* 1157: *Simple Network Management Protocol (SNMP)* (J. D. Case, M. Fedor, M. L. Schoffstall, C. Davin, May 1, 1990); RFC 2571: *An Architecture for Describing SNMP Management Frameworks* (B. Wijnen, D. Harrington, R. Presuhn, April 1999); RFC 2572: *Message Processing and Dispatching for the Simple Network Management Protocol (SNMP)* (J. Case, D. Harrington, R. Presuhn, B. Wijnen, April 1999); and *RFC* 2573: *SNMP Applications* (D. Levi, P. Meyer, B. Stewart, April 1999). Such exemplary IETF RFC documents may be found through the IETF RFC web page—http://www.ietf.org/rfc.html. Each of the aforementioned documents are incorporated herein in their entirety.

Returning to FIG. 7, in an embodiment of the present invention, controller 700 can provide high-performance bidirectional intercommunication between computer bus 702 and communication network 704. Controller 700 can include triple-speed (10/100/1000 Mbps) IEEE 802.3-compliant physical layer transceiver 706 coupled with triple-speed (10/100/1000 Mbps) IEEE 802.3-compliant media access controller (MAC) 708. MAC 708 can be adapted to provide VLAN tagging, Layer 2 priority coding, link aggregation, and full-duplex control. Control unit 710 can provide command, monitoring, and control functions utilizing status, control and interface registers 724. Control unit 710 also can include Alert Supervisory Bus Controller 716 that can be an SMBus 2.0 interface controller compliant with and providing one or both of ASF- and IPMI-protocol-related management functions, thereby enabling efficient platform management within a communication system. The term "platform management" is used to refer to the monitoring and control functions that are built in to the platform hardware, and primarily used for the purpose of monitoring the health of the system hardware. This typically includes monitoring elements such as system temperatures, voltages, fans, power supplies, bus errors, system physical security, etc. It includes automatic and manually driven recovery capabilities such as local or remote system resets and power on/off operations. It includes the logging of abnormal or 'out-of-range' conditions for later examination and alerting where the platform issues the alert without aid of run-time software. Lastly it includes inventory information that can help identify a failed hardware unit.

Although the original purpose of the SMBus was to define the communication link between an intelligent battery, a charger for the battery, and a microcontroller that communicates with the rest of the system, SMBus functionality can also be used to connect a wide variety of devices including power-related devices, system sensors, inventory E/EPROMS, and communications devices, as well as in mobile and desktop personal computers for low-speed communication in the system. In general, the SMBus protocol defines the message formats and transmission protocols for alerting and corrective action for various hardware products, including add-in cards, sensors, system servers, operating systems, management platforms, and SMBIOS, namely the SMB Internetwork Operating System, which is a local interface to reach system management information).

Controller 700 also can couple dual high-speed on-chip processors, such as CPU 720 and CPU 722, with integrated on-chip memory 718, in addition to 64 bit/66 MHz/133 MHz PCI/PCI-X local bus interface 712. Local bus interface 712 includes a predictive time base generator 714, and which can be similar to predictive PCI-X Interface Adapter 300 in FIGS. 3A and 3B, to MCBIA 500 in FIG. 5, and to MCBIA 600 in FIG. 6.

CPU 720 and CPU 722 can serve as advanced packet classification engines, providing data respectively transmitted to, and received from, network 704 with custom frame processing features such as TCP Segmentation, and can implement features such as multiple send and receive rings for Quality of Service (QoS), intelligent networking functions, such as cable diagnostics and auto network detection. The operation of Controller 700 can be represented by multiple finite state machines operating both serially and in parallel, with CPUs 720 and 722 providing Controller 700 can include a GMII (Gigabit Media Independent Interface) interface, for example, for 1000Base-SX/LX fiber applications. Controller 700 also can be disposed advantageously with a myriad of interfaces including, without limitation, XGMII (10-Gigabit Media Independent Interface), XAUI (10 Gigabit attachment unit interface), XSBI (10-Gigabit serial bus interface), SGMII (Serial Gigabit Media Independent Interface), RGMII (Reduced Gigabit Media Independent Interface), RTBI (Reduced Ten Bit Interface), as well as in TBI, SMII, and MII interfaces. Triple-speed (10, 100 and 1000 Mbps) support with standards-based auto-negotiation allows server, workstation, and desktop computer manufacturers to build solutions that can transparently interface with Ethernet, Fast Ethernet, and Gigabit Ethernet technology over existing Category 5 cabling infrastructures.

The Alert Supervisory features of the present invention can support the Alert Standard Format (ASF) specification, the Intelligent Platform Management Interface (IPMI) specification, or a combination thereof. Alert Supervisory functionality in Alert Supervisory Bus Controller 716 enables software management tools with alerting and remote control interfaces for proactively managing OS-absent networked devices. OS-absent is defined as a networked computer system in the states including no active OS, inoperable OS, or power system sleep state. Typically, the ASF protocol uses bit-based transmission protocols, including SNMP and User Datagram Protocol to provide the desired intercommunication. ASF functionality can provide network administrators with a variety of different types of alerts to manage devices on the network, for example, an alert in response to failures of specific components within a networked device. ASF functionality, also can include the Remote Management Control Protocol (RMCP), which allows a network administrator to respond to an alert remotely in many different ways: powering on the system, powering off the system, or forcing a reboot, for example, either to the default boot device or to an alternate boot device such as a Pre-Boot Execution Environment (PXE) server.

Furthermore, Alert Supervisory Bus Controller 716 can be adapted to implement Intelligent Platform Management Interface (IPMI) Specification to provide additional management functionality. IPMI allows autonomous monitoring and recovery features to be implemented directly in platform management hardware and firmware. In general, IPMI makes inventory, monitoring, logging, and recovery control functions available independently of the main processors, BIOS, and operating system. Platform management functions can also be made available when the system supported by bus 702 is in a powered-down state. IPMI functionality can support clients where there is no system management software available for the particular operating system, or the end-user elects not to load or enable the system management software. The term "platform management" can refer to the monitoring and control functions that may be built-in to the platform hardware, and used for the purpose of monitoring the health of the system hardware. This functionality can includes monitoring elements such as system temperatures, voltages, fans, power supplies, bus errors, system physical security, etc. It also can include automatically-driven and manually-driven recovery capabilities such as local or remote system resets and power on/off operations, as well as logging of abnormal or 'out-of-range' conditions for later examination and alerting where the platform issues the alert without aid of run-time software. Furthermore, IPMI functionality can provide inventory information that can help identify a failed hardware unit.

IPMI and ASF are complementary specifications that can provide platform management in a 'pre-boot' or 'OS-absent' environment. In general, IPMI is conceptualized to employ a management microcontroller as the main element of the management system, whereas the ASF architecture generally uses an 'alert sending device' to poll devices on the motherboard and autonomously generating alerts. According to the present invention, Alert Supervisory Bus Controller 716 is capable of implementing ASF functionality, IPMI functionality, and a combination thereof. Controller 716 also can support the specification of SMBus interfaces to ASF Sensor Devices, which can be polled by the alert sending device; the specification of the RMCP packet format; and the specification of SMBus-based commands that can be used to send a 'push' alert via an alert sending device. Additional IPMI capabilities can include event logging, multiple users, remote authentication, multiple transports, management extension busses, sensor access, etc.

Figure 8:
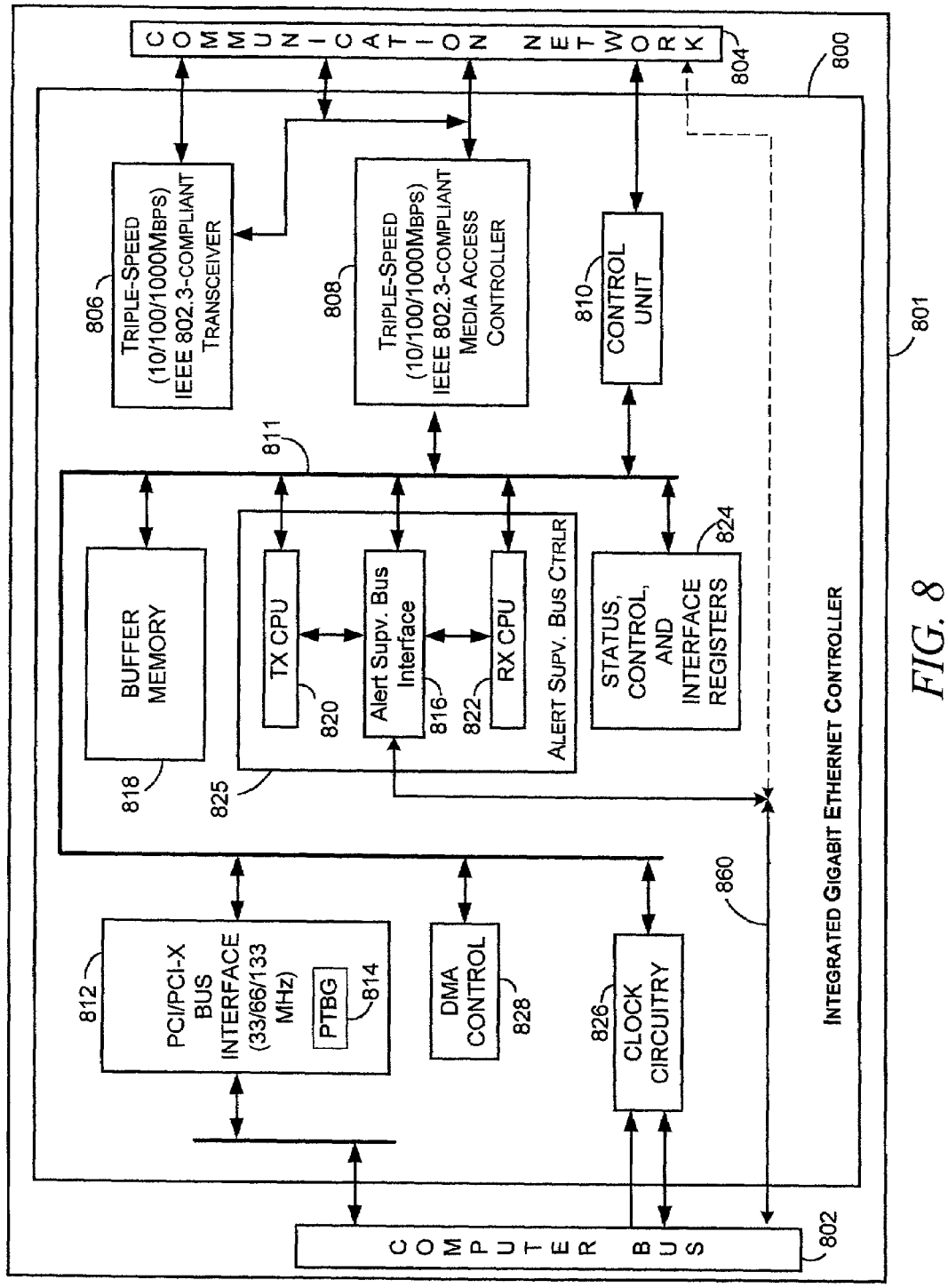
FIG. 8 is a simplified block schematic of another embodiment of an integrated, high-bandwidth local area network controller, according to the present invention.

Turning to FIG. 8, it is desirable to provide alert supervisory bus controller 825 employing TX CPU 820, RX CPU 822, or both, and alert supervisory bus interface 816, within integrated Gigabit Ethernet Controller 800. Similar to FIG. 7, controller 800 can be used to communicate alert and management data traffic, including events, between computer bus 802 and network 804, using internal bus 811, in the context of managed communication system 801. Routine Ethernet network data traffic can be bidirectionally communicated, under the coordination of control unit 810, status, control, and interface registers 824, clock circuitry 826, and DMA control 828, between network 804, and bus 802 by way of triple-speed transceiver 806, MAC 808, bus 811, and interface 812. Onboard buffer memory 818 can be used to temporarily store packets traversing bus 811 during communication and processing, and to provide flow-through queues which allow supervisory messages to be intercepted and executed. It is desirable for interface 812 to include predictive time base generator 814, for example, as described relative to MCBIA 500 in FIG. 5. Although dedicated hardware, such as, for example, controller 716 in FIG. 7, could be used to provide alert and management functionality, by adapting one or both of CPUs 820, 822 to analyze for, and respond to, the data traffic on bus 811 the presence of alert and management signals and events, to poll and receive messages from remote sensors and managed devices (not shown), and to bidirectionally convert alerts and management responses through alert supervisory bus interface 816, significant additional flexibility in system design, functionality, and upgradability can be realized in controller 825. It is preferred that Alert Supervisory functionality, as described with respect to FIG. 7, also be integral to Alert Supervisory Bus Controller 825, supporting the ASF specification, the IPMI specification, and a combination thereof.

According to the present invention, the operation of transceiver 806, MAC 808, control unit 810, registers 824, Alert Supervisory Bus Controller 825, buffer memory 818, clock circuitry 826, DMA controller 828, and PCI/PCI-X Bus Interface 812, can be represented in the abstract by a plurality of state machines. As defined herein, a state machine can include: a set of input events; a set of output events; a set of states; one or more functions that each maps states and input to output; and a function that maps states and inputs to states. Advantageously, CPU 820, CPU 822, or a combination thereof, can be used to monitor each of these state machines and provide detailed analyses of each state machine, a feature which provides operational flexibility and intelligent processing of data on bus 811, which data may include message and information conforming to multiple protocols. This permits the interception of, for example, alert supervisory states representative of alert supervisory messages embedded in a communication stream between network 804 and bus 802, and re mapping of that state, e.g., the redirection of that alert supervisory message to a different data path, for example, through alert supervisory bus interface 816 to alert supervisory bus 860, instead of through PCI/PCIX interface 812 to computer bus 802. To this end, it is desirable to include within Controller 825, at least one "rules checker" that intercepts and analyzes the traffic on bus 811 for alert supervisory-related messages. The one or more rules-checkers can operate with one or both of CPUs 820, 822.

Further, it is desirable to maintain sufficient power to Controller 825, when Interface 812, and associated circuitry, are powered down, that alerts received from bus 860, and management messages sent to devices on bus 860, continue to be processed and transmitted, even if managed client served by computer bus 802 and alert supervisory bus 860 is in a low-power state. Where both CPU 820 and CPU 822 are employed to process ASF/IPMI messages, it may be desirable, but is not required, to power-down one of these CPUs to further reduce power consumption.

Figure 9:
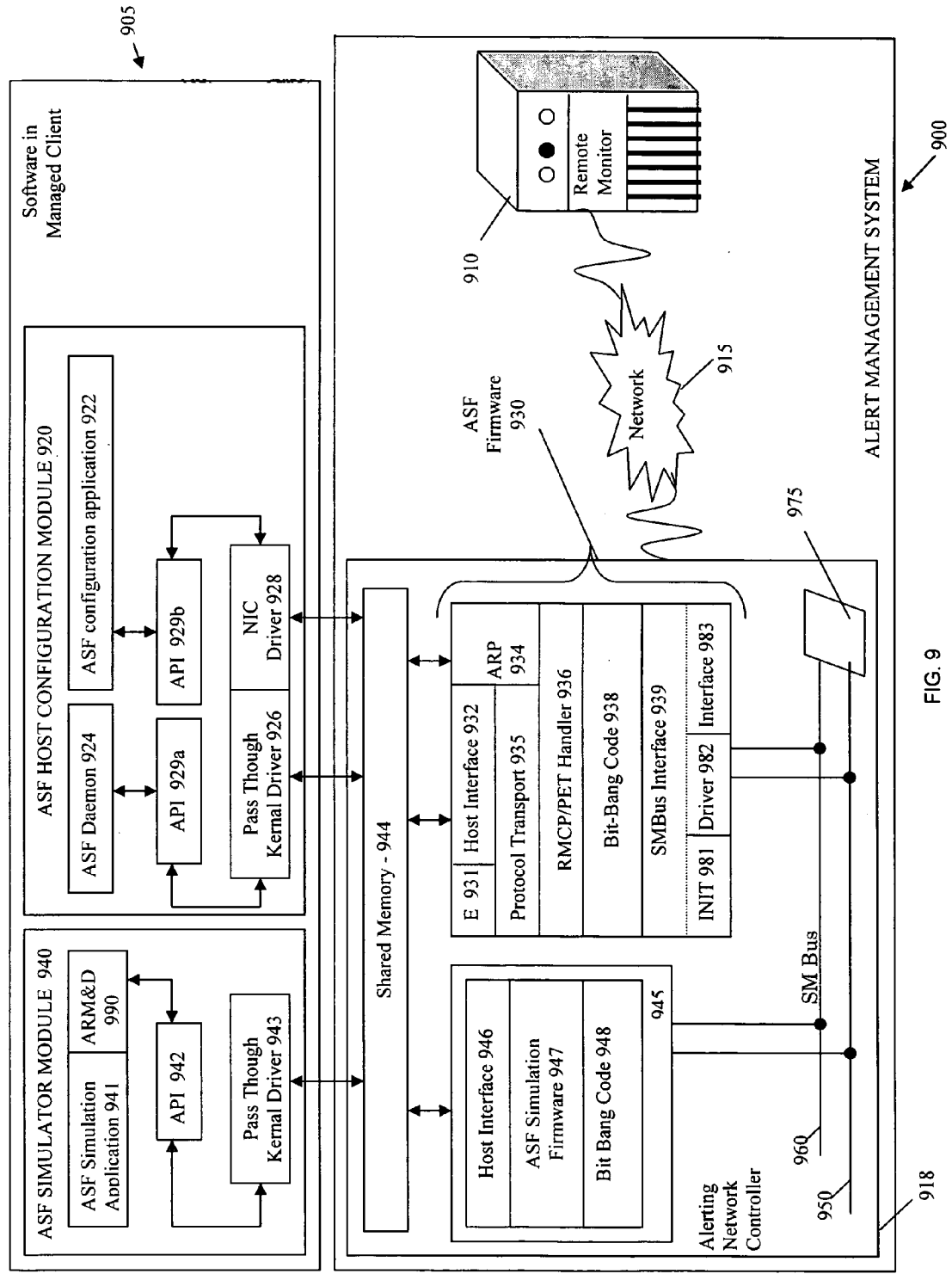
FIG. 9 is a simplified logic block schematic of an alerting network controller in the context of an alert management system.

FIG. 9 illustrates exemplary alert management system 900 in which managed client 905 communicates with and can be controlled by, remote monitor 910 over network 915. Remote monitor 910 can both monitor and control clients, such as client 905. Managed client 905 can include alerting network controller 918, which can be similar in functionality to controller 825 in FIG. 8, and alert device 975. Controller 918 is illustrative of an exemplary logical architecture for an alert management controller which communicates between network 915, computer bus 950, alert management bus 960, and alert device 975. In the context of the present invention, network 915 can be, for example, an Gigabit-capable Ethernet network, computer bus 950 can be, for example, a multiprotocol PCI/PCI-X (33/66/133 MHz) computer bus, and alert management bus 960, can be, for example, an ASF-enabled SMBus system. In certain embodiments of the PCI bus, as described in the PCI Specification and the relevant ECN(s), the PCI/PCI-X and SMBus can be co-located on the same physical bus and add-in cards, with the SMBus employing pins 40A and 41A of the PCI/PCI-X bus pinout in both the 3.3V and the 5.0V environments.

It is preferred that the present invention implement and facilitate system manageability using alerting functionality in networked systems, such as system 900, regardless of the state and types of operating system (OS) employed therein. Alerting functionality coupled with alert device 975 can provide advance warning and system failure indication from managed clients, such as managed client 905, to remote management consoles, such as remote monitor 910, over a network, such as network 915. The Alert Standard Format (ASF) specification defines a common alerting interface using a standardized low-level technology that gives administrators remote access and control to managed system 900, particularly when managed client 905 is an OS-absent state. The ASF and IPMI protocols employ the IPMI-specified Platform Event Trap (PET) to format alerts, for example, from alert device 975, which are sent by managed client 905 over network 915 to management console 910. The ASF and IPMI specifications interfaces are built upon standards-based protocols such as SNMP and UDP, which are lightweight, bit-based information carriers, suitable for implementations in hardware and/or firmware. Again, instead of implementing ASF and IPMI functionality using dedicated hardware, the invention herein gains additional flexibility and upgradability by implementing many features in firmware, using one or more processors to provide the alert supervisory capability.

In order to allow interoperability between client 905 and management console 910, it is desirable that ASF/IPMI-aware client 905: (1) transmits the alert messages produced by client 905; (2) receives the remote maintenance requests from monitor console 910 and transmits the associated responses by client 905; (3) provides the data description of the system-specific capabilities and characteristics of client 905; and (4) provides the software used to configure or control client system 905 in an OS-present state. An additional level of interoperability can occur between a client system's alerting components, such as alert device 975, and remote monitor 910 when the system firmware is used to communicate system capabilities; and format the messages sent between the device 975, client 905, and remote monitor 910.

Once a system alert provides its warning or error report, the next step in remote system manageability is to allow corrective action to be taken, including enabling remote monitor 910 to remotely reset, and power-on or power-off client 905. When client 905 is in an OS-present state, these actions can be provided, for example, by Common Information Model (CIM) interfaces that interact with client 905 to provide orderly shutdown capabilities. The ASF-enabled device, such as device 975, can provide similar functionality when client 905 is in an OS-absent state. CIM interfaces are defined in detail in the DTMF document *Common Information Model (CIM) Specification, Version* 2.2, Jun. 14, 1999, which is incorporated herein in its entirety.

It is desirable that the ASF/IPMI-aware features of the present invention be implemented in the context of a control bus 960 for system-related and power management-related tasks, such as the System Management Bus (SMBus). An SMBus is a multiple attachment bus having two-wire interface through which various system components can communicate with each other and with the rest of the system. The System Management Bus Specification refers to three types of devices: slave, master, and host. A slave is a device that is receiving or responding to a command. A master is a device that issues commands, generates the clocks, and terminates the transfer. A host is a specialized master that provides the main interface to the system's CPU. A bus slave device can receive data provided by the master or it can provide data to the master. A device may be designed so that it is always a slave, always a master, or a combination thereof, depending upon the particular circumstances. For example, a system host is an example of a device that acts as a host most of the time, but that includes some slave behavior. Multiple devices, both bus masters and bus slaves, may be connected to an SMBus segment. Typically, one device will master the bus at a given time. Because more than one device may attempt to take control of the bus as a master, SMBus provides an arbitration mechanism that can rely, for example, on the wired-AND connection of all SMBus device interfaces to the SMBus. Generally, a bus master device initiates a bus data transfer with a single bus slave, providing clock signals associated with the transfer. Presently, SMBus has substantially no routing capability with communication typically occurring between two nodes, a master and a slave, except where devices implement the Address Resolution Protocol as well as the Alert Response Address.

Under the SMBus protocol, ASF/IPMI-aware alert device 975 can provide, for example, manufacturer information, model/part number, previous control state and present status, error reports. Device 975 also accept control parameters, and return its status.

Continuing in FIG. 9, it is generally desirable that controller 918 be an ASF-enabled controller supporting an ASF alerting function in device 975, and an ASF remote management and control function in remote monitor 910. It also is desirable to provide ASF-enabled controller 918 with ASF Support modules which can include an ASF Host Configuration module 920, ASF Controller Firmware 930, and ASF Simulator 940. It further is desirable to provide ASF Remote Monitor & Diagnostic Software in remote monitor 910. Controller 918 can be a network interface card (NIC), LAN-on-motherboard (LoM) device, or other alerting network controller intervening between managed client 905 and remote monitor 910. Indeed, where the term "NIC" is used, it will be understood that the associated principles can be used, mutatis mutandi, in the context of a LoM or other alerting network controller.

ASF Host Configuration module 920 can be used to configure ASF operation on host system 905, in an OS-present situation, and can include interoperable modules such as ASF Configuration Application 922, ASF Daemon module 924, and "Pass-through" kernel mode driver module 926. To make application modules 922, 924 readily accessible by end-users, it is desirable to provide a graphical user interface (GUI), which is supported by common operating systems, such as, for example, Windows-related and Unix-related operating systems, using application programming interfaces (API) 929a,b.

ASF Configuration Application 922 permits end-users to configure ASF-related parameters which can include, without limitation: (1) RMCP enable/disable; (2) alerting (PET) enable/disable; (3) enable/disable automatic ARP; (4) sensor selection and masking; (5) identification of remote console, e.g. remote IP Address identification; local IP address configuration; (6) heartbeat message configuration; NIC SMBus slave address configuration; (7) OEM or IPMD customizations; (8) OS-present behavior; and (9) NIC Driver heartbeat.

For sensor selection and masking, it is desirable that ASF Configuration Application 922 provide information about sensors that have been detected in the system, such as device 975, and allow the user to mask off alerts that would have otherwise been generated from those sensors. Heartbeat message configuration can include message enable, disable, time interval, and the like. For address configurations of alert devices, such as device 975, it is desirable to permit selection between dynamic and fixed addresses and, if fixed, configuration of the fixed address. Included in the configured OS-present behavior can be enable/disable RMCP and/or PET, while the network driver loads. In addition, the NIC Driver heartbeat can be used by ASF firmware 930 to detect the health of the OS and NIC Driver software 928, causing a PET to be generated if either becomes disabled.

It also is desirable that ASF Configuration Application 922 retrieve data represented in the ASF! Table and SMBIOS structures via an ACPI mechanism, where an ASF capable system and its supporting SMBIOS are available, or from a predetermined data file, which can be an ASCII text file, in the absence of such a system. The predetermined data file can be stored in EEPROM 931, and can contain descriptions of the system and devices to be simulated, such as system's UUID/GUID, sensor device address, device type and their capabilities. The contents of the ASF! Table and SMBIOS structures, as well as the applicable ACPI mechanism are described in detail in the applicable aforementioned ASF, SMBus, and ACPI specifications, respectively, as would be well-known to a skilled artisan.

It also may be desirable to integrate selected User Diagnostic functions with ASF Configuration Application 922, to detect and diagnose problems such as: SMBus interface faults; non-ASF-supporting NICs; and erroneous or misconfigured remote console IP address. It further is desirable to provide support for unattended installation, so that ASF Configuration Application 922 can be operated without user interaction with the GUI screen.

ASF Daemon module 924 communicates with ASF Firmware 930 via Shared Memory 944, for example, to detect an IP address change of local client 905 and to pass the new local IP address to ASF Firmware 930. ASF Daemon module 924 can run as a background task when it is loaded by the OS, regardless of whether NIC driver 928 is loaded. Host Interface "Pass-Through" Driver module 926 is a kernel-mode driver that provides ASF Daemon module 924 access to the NIC hardware, including Shared Memory 944. "Pass-Through" Driver module 926 can be loaded when ASF Daemon 924 is invoked, and unloaded when ASF Daemon 924 is terminated.

Ethernet Port Driver module 928 can be used to handle multiple ASF functions including interacting with network 915. Module 928 can parse and construct ASF packets, and thus it is desirable for Ethernet Port Driver module 928 to have awareness of OSI Layers 2–4. Ethernet Port Driver module 928 can handle the reception of packets; parse incoming packet stream to look for RMCP or ARP packets; and transmit packets, including PET, RMCP, and ARP reply packets. It is desirable that the Alerting Protocol Handler (APH) include a Platform Event Trap (PET) frame assembler to build SNMP Trap PDU frames, based on a message coming from the aforementioned SMBus module. It is desirable that the APH has an understanding of ASN. 1 BER. The APH also can be disposed to manage Sensor Poll timers, ensuring that sensors are polled at the proper times; manage PET packet transmission and re-transmission; and facilitate the transmission of heart-beat packets.

In order to operate in an OS-absent environment, ASF firmware 930 can be used to interface to SMBus 960, and also to send/receive ASF management packets (RMCP and/or PET) via network 915. ASF firmware 930 can advantageously include Host interface 932; Network ARP Handler 934; Alerting Protocol Handler 935; Remote Management and Control Protocol (RMCP)/Platform Event Trap (PET) Handler 936; Bit-Bang software module 938; and SMBus Interface 939.

Host Interface 932 can be configured to send and receive RMCP packets; peek and poke at stored ASF data structures and registers; accept commands from a host diagnostic to control/initiate ASF functions; and allow the simulation of ASF events. It is desirable that Host Interface Module 932 of controller 918 expose a portion of its memory, i.e., Shared Memory 944, such that it can be accessed from both firmware 930 of controller 918 and the CPU of managed client 905. ASF Firmware 930 uses Shared Memory interface 944 to communicate with both ASF Daemon module 924 and NIC Device Driver 928. In cooperation with ASF Daemon module 924, ASF Firmware 930 receives IP address update request via Shared Memory 944 of Host Interface 932, and updates the new IP address in EEPROM 931. In addition, the new IP addresses are propagated to all relevant firmware modules such as ARP, ICMP (PING), RMCP, and PET. It is preferred that this update take effect immediately, without requiring system reboot, or re-running of ASF Host Configuration module 920. In one embodiment of the present invention, ASF Firmware 930 can receive two events from the NIC device driver 928: "Halt ASF" and "NIC Driver started". When ASF Firmware 930 receives the "Halt ASF" request event, it will purge all data transfer activities on network 915, SMBus 960 and Shared Memory 944, and put client 905 into an "idle" state. Accompanying the "Halt ASF" request can be a "boot option" parameter, which can be used by the bootstrap loader of controller 918 to decide whether or not the next boot should boot from ASF firmware 930 or from another memory location. When ASF Firmware 930 receives the "NIC Driver started" notification event, it propagates this event to relevant firmware modules such as ARP and ICMP (PING), so these operations can be disabled, or bypassed, while in the "OS present" environment to avoid handling conflicts between the OS and ASF Firmware 930.

In order for the RMCP protocol to function in an OS-absent state, ARP Handler 934 enables controller 918 via client 905 to respond to network Address Resolution Protocol (ARP) requests from the local router. If controller 918 was not capable of responding to ARPs on its own, then a router might not be able to forward an RMCP packet to the ASF-enabled client 905, because the router would not know the Ethernet MAC address of managed client 905. Therefore ASF firmware 930 can possess, within ARP Handler 934, the intelligence to detect network ARP requests and automatically generate an ARP response without any intervention from host based system software. Network ARP Handler 934 also can provide a "rules-checker" to identify network ARPs; respond to ARPs, if configured; and provide a Module Interface to SMBus module 939. Remote Management and Control Protocol (RMCP) Handler 936 manages the RMCP protocol transactions within Firmware 930. Handler 936 can be disposed to provide a controller "rules checker" used to identify RMCP packets; to parse incoming RMCP packets, and identify the response needed for specific RMCP messages; to process RMCP ACKing; and to respond to RMCP messages, for example, pong response, capabilities response, and pass control packet to SMBus entity. Also, RMCP Handler 936 can include a RMCP frame assembler, to build PDU content for RMCP messages; and may have an IPMI/OEM custom message handler, which decodes RMCP IPMI packets and responds in the correct manner, and which drives IPMI/custom messages across SMBus 960.

SMBus Interface 939 is that portion of ASF firmware 930 which interfaces to, and communicates with, SMBus 960, and can include Initialization module 981, SMBus Driver and Protocol Handler 982, as well as a Module Interface 983. Initialization module 981 can be used to initialize hardware; to allow dynamic assignment of the Alerting Network Controller 918 SMBus address; to read EEPROM 931 content to learn about SMBus devices and legacy polling devices in system 905; and to discover ASF sensors in system 905. SMBus Driver and Protocol Handler 982 can be responsible for driving SMBus interface 983 of integrated controller 918; and for bidirectionally translating sent and received messages between the ASF SMBus message level and the SMBus byte level. SMBus Handler 982 can poll sensors, such as device 975, on SMBus 960; receive SMBus "push" messages, for example, from device 975; perform error checking for SMBus 960; and handle SMBus ARP. In conjunction with Interface 939, Bit-Bang module 938 can perform the SMBus "bit-bang." Finally, the Module Interface can be employed to generate messages to be sent to, and handle messages received from other modules, such as, for example, PET and RMCP.

In certain embodiments of the present invention, it is desirable to include ASF Simulator 940 in order to permit controller 918 to perform ASF-related functions without the presence of a working ASF-capable system platform. Furthermore, it also is desirable to provide an ASF SMBus Sensor and Device Emulator 945 that can drive another SMBus entity in system 905 to emulate a SMBus sensor or microcontroller. Advantageously, SMBus interface 949 can be used as a SMBus Sensor Emulator to simulate the function and the behavior of, for example, Legacy Sensor Devices, ASF Sensor Devices, and ASF Remote Control Devices.

ASF Simulator 940 can simulate sending SMBus messages to, and receiving messages from, the controller 918. It is desirable to provide Simulation GUI Application 941, which can allow an end-user: to enable/disable which device to simulate; to change a sensor device's state, sensor value, or both; and to observe "Remote Control Action" and return appropriate responses. It also is desirable that ASF Simulator 940 be capable of emulating sensor firmware by providing, for example and without limitation, the ability to: (1) push SMBus alert messages, with or without retransmission, to the controller 918; (2) emulate a legacy sensor, and respond to a SMBus legacy sensor poll from the controller 918; (3) emulate an ASF sensor, and respond to a SMBus alert poll from the controller 918; (4) send "Get Boot Option" SMBus messages to the controller 918; (5) send "Device Type Poll" SMBus messages controller 918; (6) send start/stop watchdog timer messages to controller 918; (7) receive and display "Remote Control Action" SMBus messages from controller 918; and (8) receive and display "Boot Options Response" SMBus messages from controller 918.

Furthermore, it may be desirable to include with ASF Simulation Application 941, ASF Remote Monitor & Diagnostic (ARM&D) Software 990 to emulate a remote console, and could be used to send RMCP traffic to the Controller 918. ARM&D Software 990 can be used to test and verify that ASF-enabled controller 918 can send and receive ASF messages correctly over Ethernet medium network 915 coupled therewith, as well as to display the contents of incoming RMCP or PET messages. ARM&D software 990 can provide the ability: (1) to generate any form of RMCP packet that could be sent to a NIC, LoM, or controller, in a manner easily selectable by an end-user; (2) to capture and display the contents of RMCP packets received from the NIC; and (3) to verify that the controller 918 properly handles out-of-order or malformed RMCP packets; and, optionally, to parse and display incoming PET packets.

Figure 10:
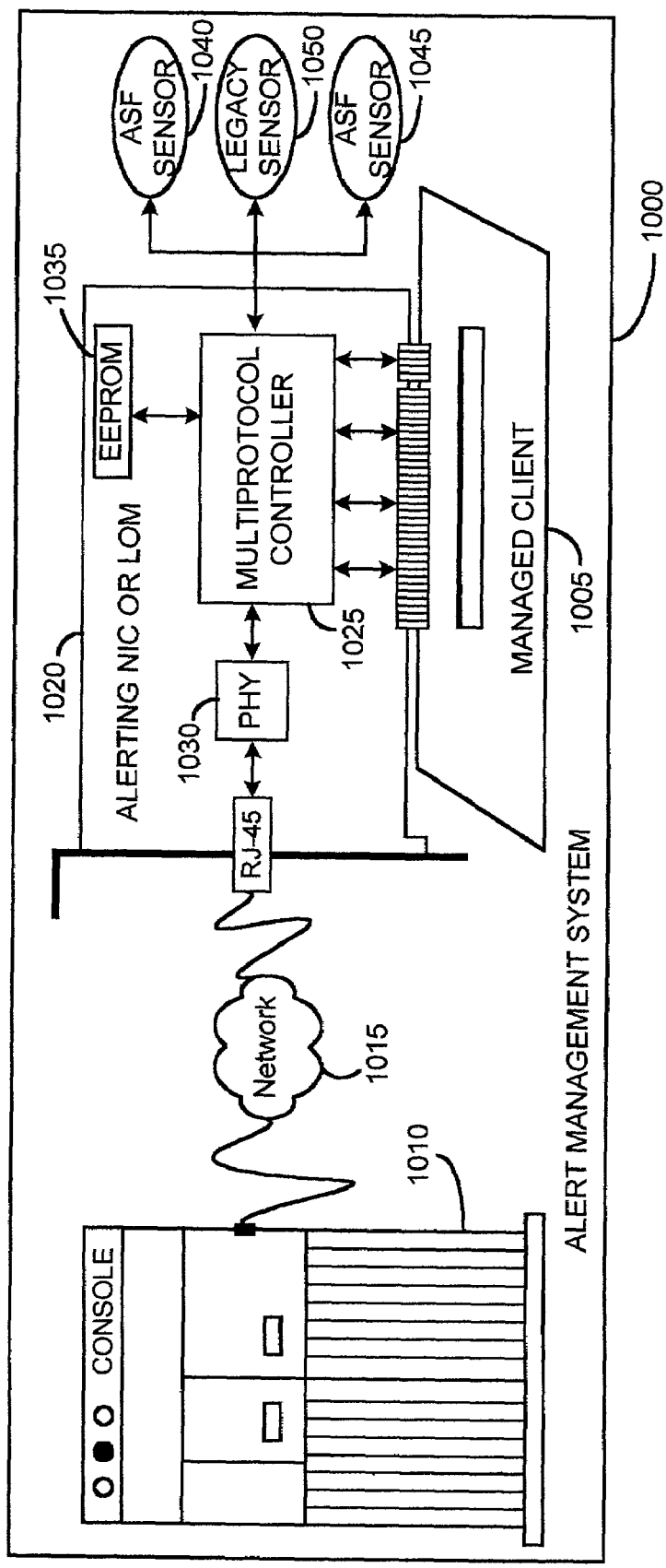
FIG. 10 is a simplified block schematic of an alert management system having a multiprotocol controller according to the present invention.

Turning to FIG. 10, alert management system 1000 can include managed client 1005 communicating with remote management console 1010 across network 1015. Managed client 1005 is disposed with alerting controller 1020, which can be, for example, a network interface card, LAN-on-Motherboard integrated circuit, or other device suitable for facilitating networked communications between a remote console and a client. Transceiver 1030 can be coupled with Controller 1025 on Controller 1020 to receive and transmit data over network 1015. In order to convert these communications between a protocol suitable for network 1015 and one or more protocols suitable for use with managed client 1005, it is desirable to use multiprotocol controller 1025. Controller 1025 is desired to be a multiprotocol computer bus interface adapter, similar to MCBIA 500 in FIG. 5, but which is adapted to provide SMBus functionality, as described, for example, relative to FIGS. 7, 8, and 9, in addition to PCI/PCI-X bus functionality, as described relative to FIG. 5. Therefore, in addition to communicating with the computer system of managed client 1005, multiprotocol controller 1025 also can communicate with alert devices 1040, 1045, 1050, which can be, for example, sensors. In the embodiments where multiprotocol controller 1025 employs the ASF and SMBus protocols to communicate with the alerting devices of managed client 1005, one or more of devices 1040, 1045, 1050, can be ASF-enabled devices or sensors, such as sensors 1040, 1045, or a legacy device or sensor, such as sensor 1050. Network, system and alert device parameters can be stored in memory device 1035, which is desired be an EEPROM, flash EPROM, or other non-volatile memory device.

Figure 11:
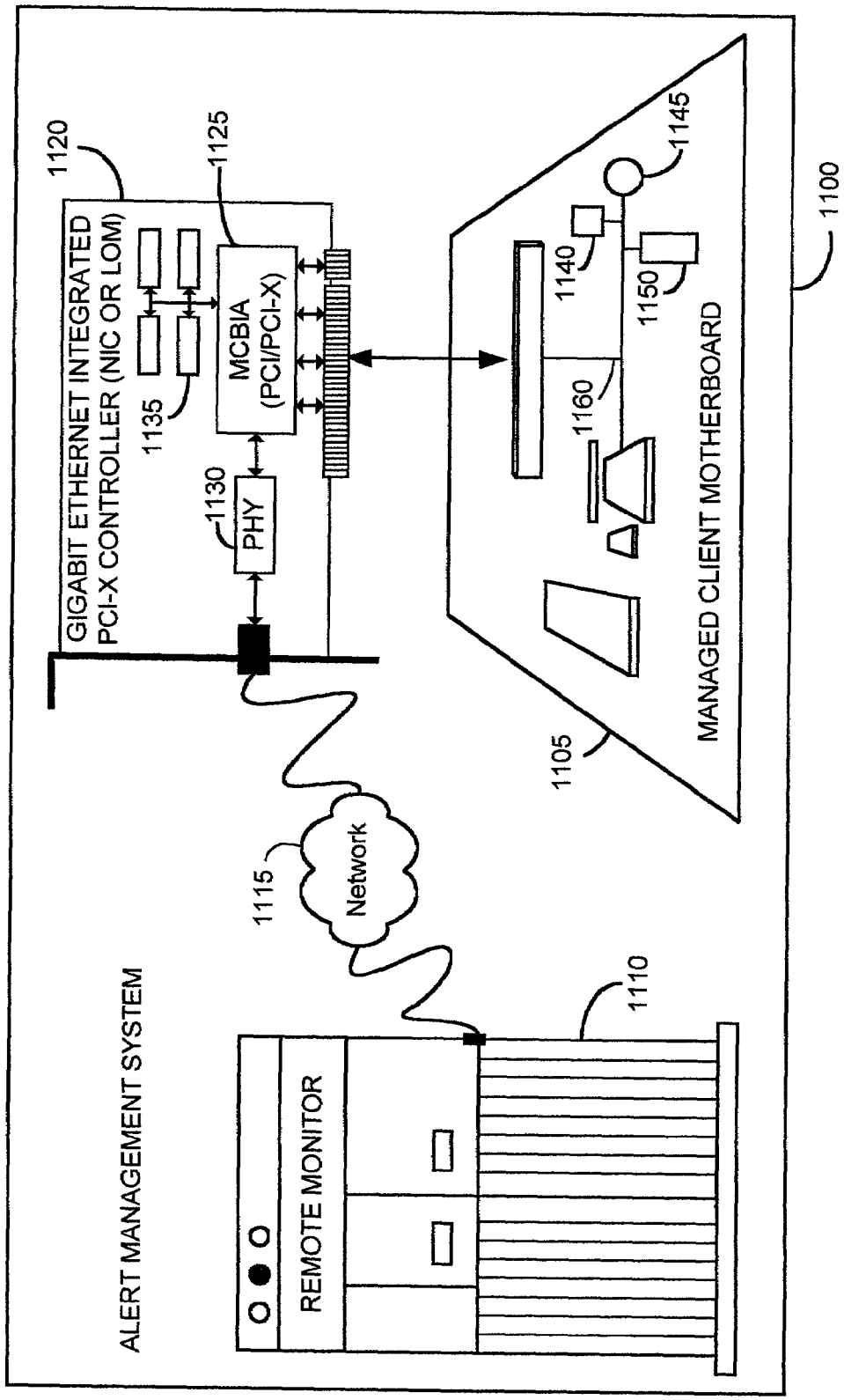
FIG. 11 is a simplified block schematic of an alert management system having an Integrated PCI-X controller according to the present invention.

FIG. 11 illustrates another aspect of the present invention as implemented within the context of communicating Remote Management Control Protocol (RMCP) messages within Alert Management System 1100, using Gigabit Ethernet Integrated PCI-X Controller 1120. Controller 1120 can be similar to controller 1020 in FIG. 10. RMCP, a UDP-based protocol, can be advantageously used to support client control functions, for example, when managed client 1105 is in an "OS absent," "low-power," or "pre-boot" state, by enabling management console 1110 to remotely control and manage client 1105 across network 1115. Remote monitor 1110 can use such RMCP messages to detect an event, e.g., one reported within the context of a Platform Event Trap (PET), that occurs in managed client 1105, and to take appropriate action responsive to the PET. In addition, Remote Console 1110 can remotely issue typical control commands to managed client 1105 to execute system control functions including reset, power-up, power-down, etc. Furthermore, as in FIG. 10, transceiver 1130 can be coupled with Controller 1125 on Controller 1120 to receive and transmit data over network 1115. Controller 1125 is desired to be a multiprotocol computer bus interface adapter (MCBIA), similar to controller 1025 in FIG. 10, which is adapted to communicate using, for example, PCI, PCI-X, and SMBus bus protocols.

During operations of managed client 1105, for example, during an OS-absent state, sensor 1140 can detect a state to which remote monitor 1110 should be alerted. In this case, sensor 1140 transmits alerting information as a PET to MCBIA 1125, which forms packets into an RMCP message to be received by Remote Monitor 1110. In response to the received alerting information, or according to other criteria, Monitor 1110 can communicate a message in the form of one or more data packets, formed according to the RMCP protocol, across network 1115 to managed client 1105. PHY 1130 receives the RMCP message, converts it to the proper medium protocol, and passes the message to MCBIA 1125. MCBIA 1125 can parse incoming RMCP packets, and then take the appropriate action, including RMCP management operations, such as a presence pong to Monitor 1110. For remote control commands, such as reset and power-up/power-down, MCBIA 1125 passes the parsed command over SMBus 1160 to remote control function device 1145, effecting the desired function on managed client 1105. In addition, MCBIA 1125 can be enabled to communicate with system firmware 1150 of managed client 1105, for example, to configure boot options and the like.

In certain embodiments of the present invention, network controller 1120, or MCBIA 1125 can be realized in a single-chip VLSI implementation, for example, an 0.18 micron CMOS VLSI implementation, which can be particularly advantageous for application of these embodiments to Gigabit Ethernet Network Interface cards and LAN-on-Motherboard (LoM) systems. One product embodying aspects of the present invention in a VLSI implementation may include, for example, a Gigabit Ethernet Integrated PCI-X Controller.

Many alterations and modifications may be made by those having ordinary skill in the art without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A network controller, comprising:
   a. a multiprotocol bus interface adapter coupled between a communication network and a computer bus, the adapter having:
      (1) a clock signal input;
      (2) a data delay element interposed in an output data path and imposing a predetermined output data delay upon output data; and
      (3) a predictive time base generator coupled with the clock signal input and the data delay element; and
   b. an alert supervisory controller coupled with the multiprotocol bus interface adapter, and adapted to monitor and manage preselected components coupled with one of the communication network and the computer bus.

2. The network controller of claim 1, wherein the computer bus is adapted to employ one of a PCI protocol, a PCI-X protocol, and a combination thereof.

3. The network controller of claim 1, wherein the network controller is adapted to be a 10/100/1000BASE-T IEEE Std. 802.3-compliant network controller.

4. The network controller of claim 1, wherein the alert supervisory bus controller is adapted to employ at least one of an Alert Standard Format (ASF) specification protocol, a System Management Bus (SMBus) specification protocol, an Intelligent Platform Management Interface (IPMI) specification protocol, and a Simple Network Management Protocol (SNMP).

5. The network controller of claim 1, wherein:
   a. the multiprotocol bus interface adapter is adapted to employ one of a PCI protocol, a PCI-X protocol, and a combination thereof;
   b. the alert supervisory bus controller is adapted to employ at least one of an Alert Standard Format (ASF) specification protocol, a System Management Bus (SMBus) specification protocol, an Intelligent Platform Management Interface (IPMI) specification protocol, and a Simple Network Management Protocol (SNMP); and
   c. the network controller is adapted to be a 10/100/1000BASE-T IEEE Std. 802.3-compliant network controller.

6. The network controller of claim 5, further comprising:
   a. a 10/100/1000BASE-T IEEE Std. 802.3-compliant transceiver coupled with the communication network; and
   b. a 10/100/1000BASE-T IEEE Std. 802.3-compliant media access controller (MAC) coupled with the transceiver.

7. The network controller of claim 6, further comprising a buffer memory coupled with the MAC.

8. The network controller of claim 7, wherein the buffer memory includes one of a packet buffer memory, a frame buffer memory, a queue memory, and a combination thereof.

9. The network controller of claim 7, further comprising a CPU used to transmit and a CPU used to receive coupled with the multiprotocol bus interface adapter and the alert supervisory bus controller.

10. The network controller of claim 9, wherein at least one of the multiprotocol computer bus interface adapter and the alert supervisory bus controller further comprises a Gigabit Media Independent Interface (GMII) interface, an 10-Gigabit Media Independent Interface (XGMII), a 10-Gigabit attachment unit interface), XSBI (10-Gigabit serial bus interface (XAUI), a Serial Gigabit Media Independent Interface (SGMII), a Reduced Gigabit Media Independent Interface (RGMII), a Reduced Ten Bit Interface (RTBI), a Ten-Bit Interface (TBI), a Serial Gigabit Media Independent Interface (SMII), and a Media Independent Interface (MII).

11. The network controller of claim 10, wherein the multiprotocol bus interface adapter interfaces one of an IEEE Std. 802.3-like protocol, a SONET/SDH-like protocol, a Fiber-Channel-like protocol, an SCSI-like protocol, and an InfiniBand-like protocol.

12. The network controller of claim 9, further comprising a single-chip VLSI device.

13. The network controller of claim 12, wherein the single-chip VLSI device is an 0.18 micron CMOS VLSI implementation.

14. The network controller of claim 1 wherein the time base generator includes a predictive synchronizer having a synchronizing feedback loop therein.

15. The network controller of claim 14 wherein the time base generator includes a replica delay element coupled with the synchronizing feedback loop and adapted to provide feedback delay substantially replicating the predetermined output data delay, the replica delay element causing the predictive time base generator to provide a predictive clock signal to the data delay element and substantially reducing the predetermined output data delay.

16. A communication system, comprising:
  a. a multiprotocol bus interface adapter coupled between a communication network and a computer bus, the adapter having:
    (1) a clock signal input;
    (2) a data delay element interposed in an output data path and imposing a predetermined output data delay upon output data; and
    (3) a predictive time base generator coupled with the clock signal input and the data delay element;
  b. an alert supervisory bus controller coupled with the multiprotocol bus interface adapter; adapted to monitor and manage preselected components coupled with one of the communication network and the computer bus; and adapted to employ at least one of an Alert Standard Format (ASF) specification protocol, a System Management Bus (SMBus) specification protocol, an Intelligent Platform Management Interface (IPMI) specification protocol, and a Simple Network Management Protocol (SNMP);
  c. a 10/100/1000BASE-T IEEE Std. 802.3-compliant transceiver coupled with the communication network;
  d. a 10/100/1000BASE-T IEEE Std. 802.3-compliant media access controller (MAC) coupled with the transceiver;
  e. a buffer memory coupled with the MAC, wherein the buffer memory includes one of a packet buffer memory, a frame buffer memory, a queue memory, and a combination thereof; and
  f. a CPU used to transmit and a CPU used to receive coupled with the multiprotocol bus interface adapter and the management bus controller to process data respectively transmitted to and received from the computer network;

wherein at least one of the multiprotocol computer bus interface adapter and the alert supervisory bus controller further comprises a Gigabit Media Independent Interface (GMII) interface, an 10-Gigabit Media Independent Interface (XGMII), a 10-Gigabit attachment unit interface), XSBI (10-Gigabit serial bus interface (XAUI), a Serial Gigabit Media Independent Interface (SGMII), a Reduced Gigabit Media Independent Interface (RGMII), a Reduced Ten Bit Interface (RTBI), a Ten-Bit Interface (TBI), a Serial Gigabit Media Independent Interface (SGMII), and a Media Independent Interface (MII), and wherein the multiprotocol bus interface adapter interfaces one of an IEEE Std. 802.3-like protocol, a SONET/SDH-like protocol, a Fiber-Channel-like protocol, an SCSI-like protocol, and an InfiniBand-like protocol.

17. The communication system of claim 16, further comprising a single-chip VLSI device in an 0.18 micron CMOS VLSI implementation.

18. The communication system of claim 17, wherein the single-chip VLSI device is implemented in one of a network interface card, and a LAN-on-Motherboard application.

19. A communication system as in claim 16 wherein the time base generator further includes a predictive synchronizer having a synchronizing feedback loop therein.

20. A communication system as in claim 19 wherein the time base generator further includes a replica delay element coupled with the synchronizing feedback loop and adapted to provide feedback delay substantially replicating the predetermined output data delay, the replica delay element causing the predictive time base generator to provide a predictive clock signal to the data delay element and substantially reducing the predetermined output data delay and wherein the computer bus and the multiprotocol bus interface adapter are adapted to employ one of a PCI protocol, a PCI-X protocol, and a combination thereof.

* * * * *